Feb. 19, 1963
G. R. P. MARIÉ
3,078,061
PULSE-JET AIRCRAFT AND ENGINE AND DIFFUSION
SYSTEMS FOR USE THEREIN
Filed Jan. 10, 1961
8 Sheets-Sheet 3
Fig. 5.
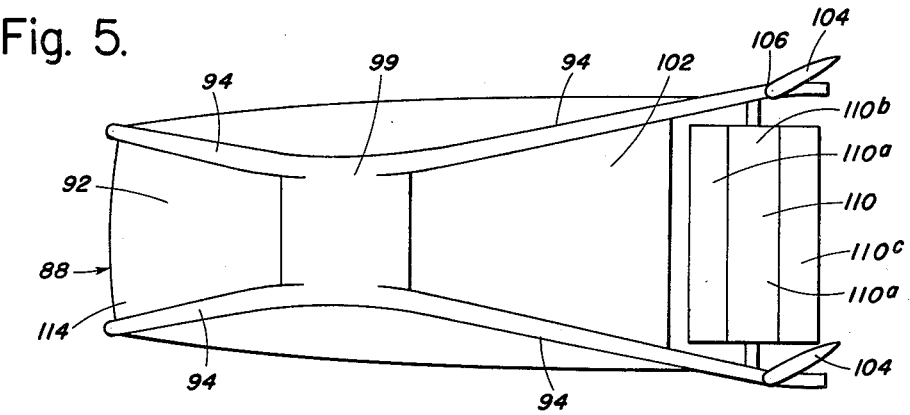
Fig. 6.
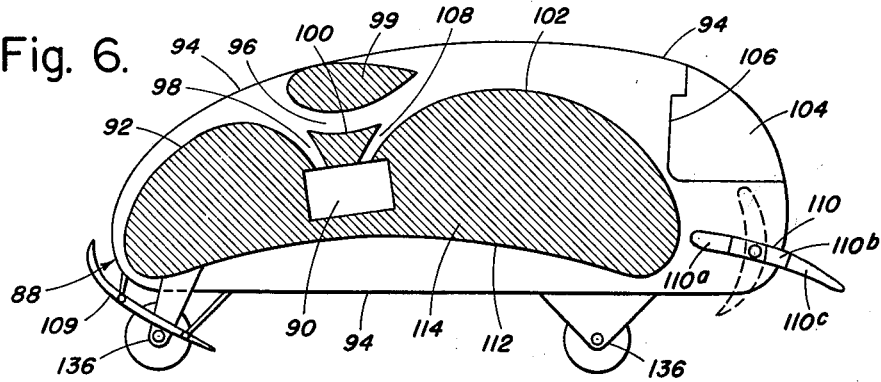
Fig. 12.
INVENTOR
Georges Robert Pierre Marié
BY
Charles J. Elderkin
ATTORNEY

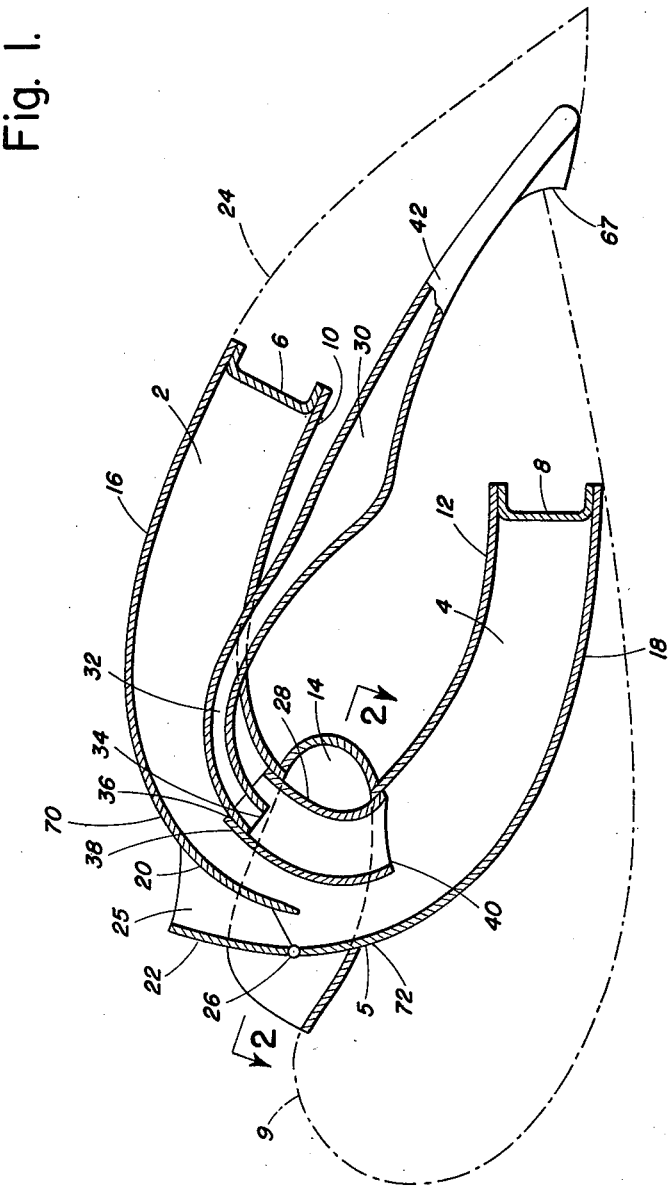

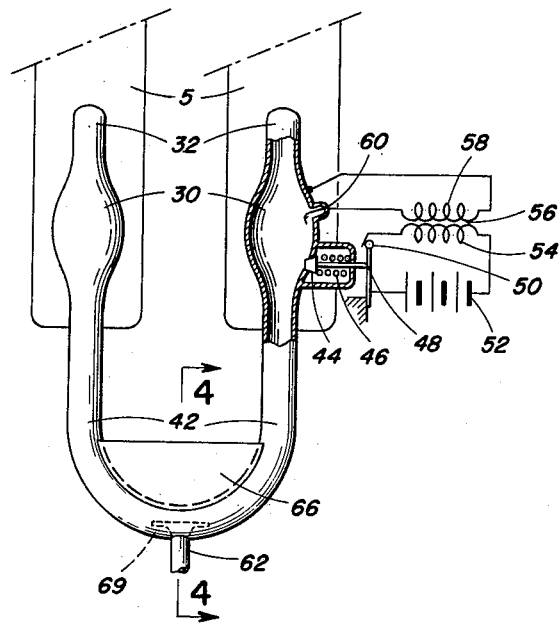
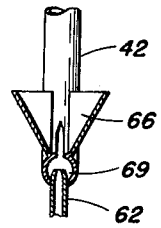
Fig. 3.    Fig. 4.
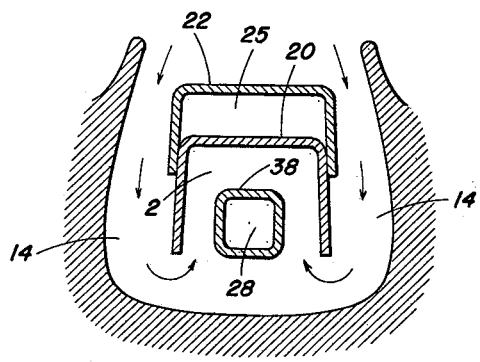
Fig. 2.

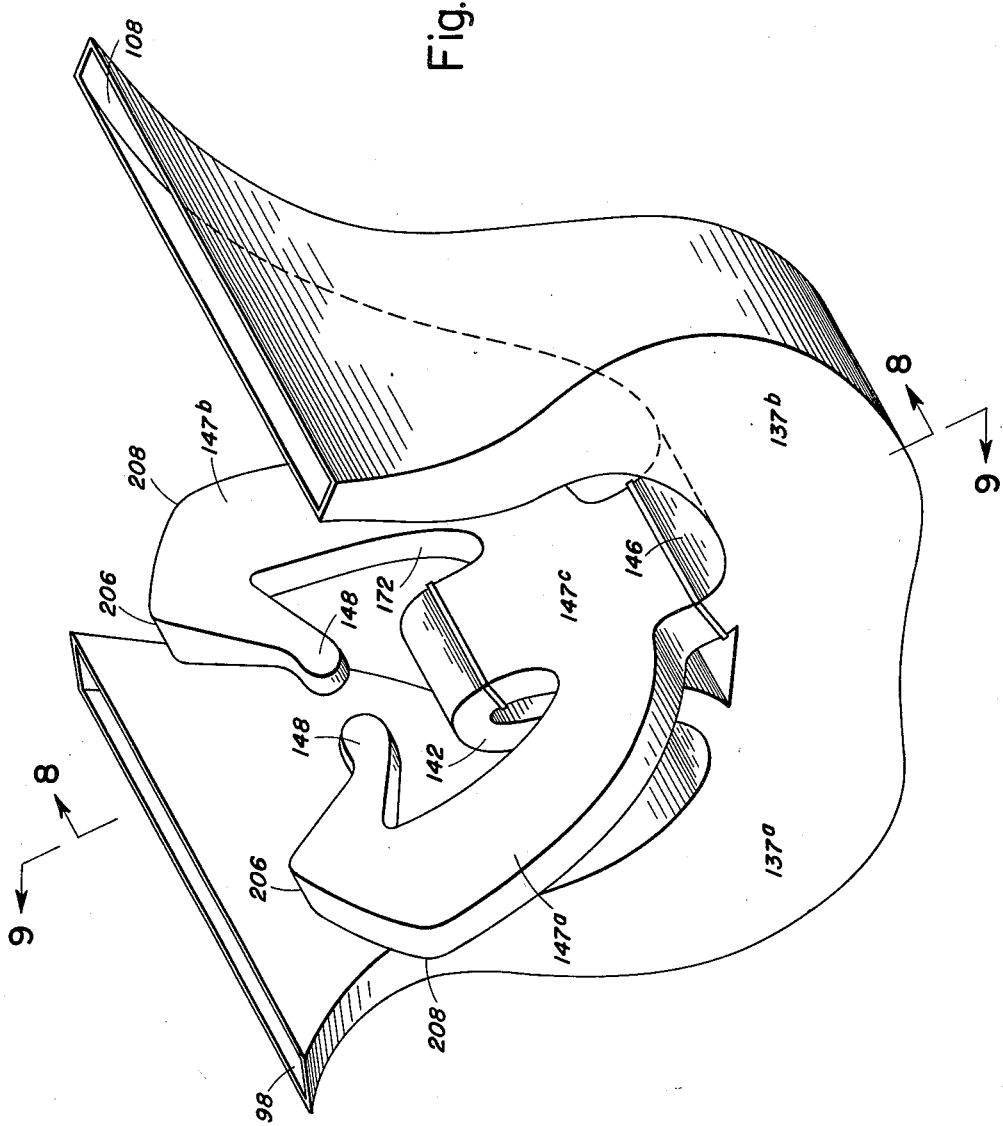

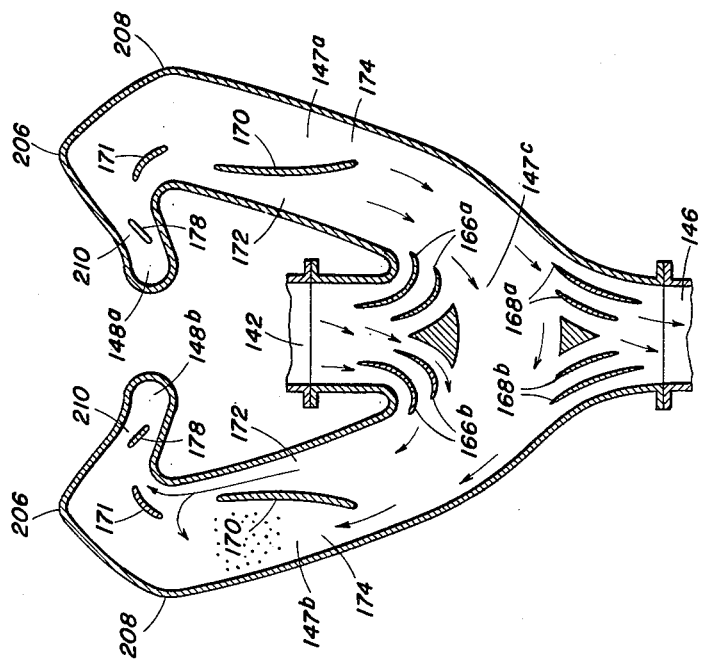
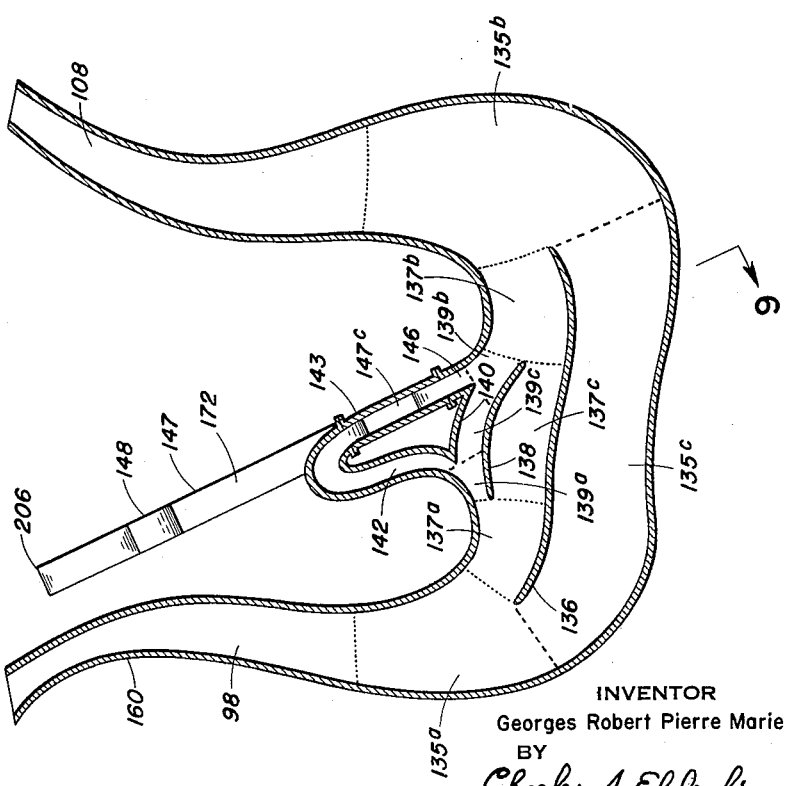

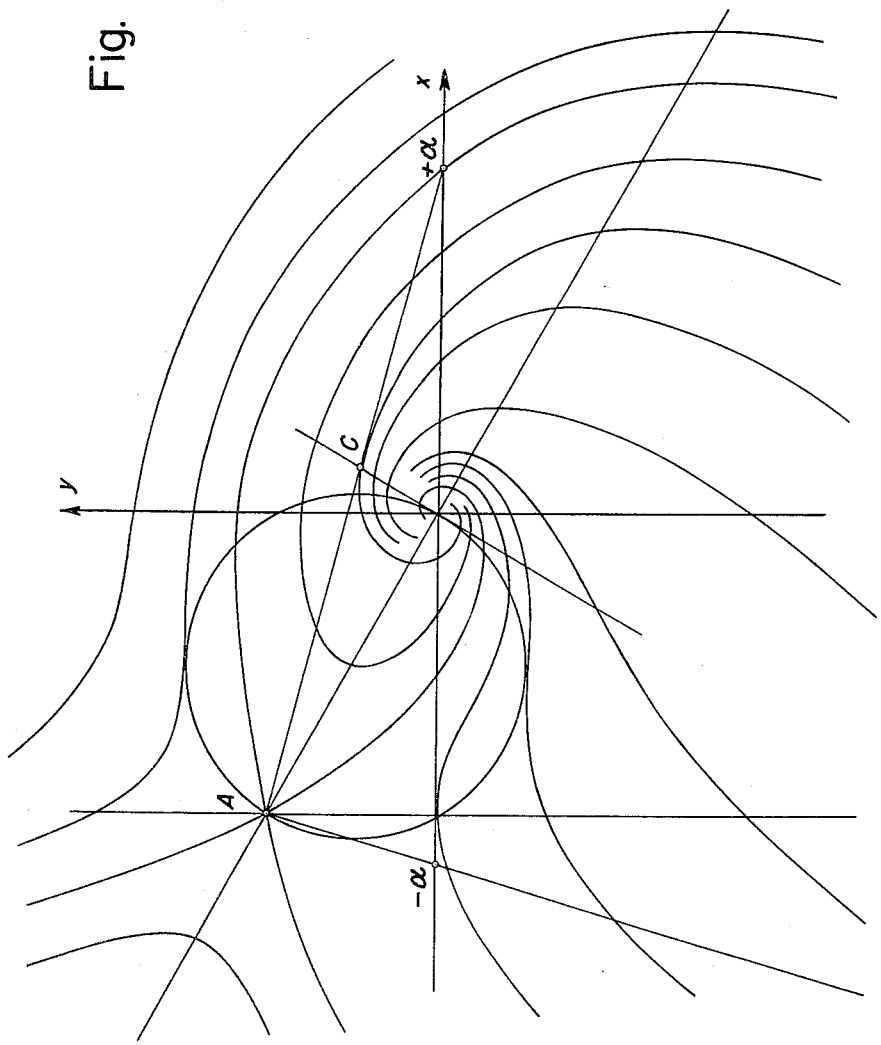

United States Patent Office 3,078,061
Patented Feb. 19, 1963

3,078,061
PULSE-JET AIRCRAFT AND ENGINE AND DIFFUSION SYSTEMS FOR USE THEREIN
Georges R. P. Marié, Paris, France
(21 Edgewood Road, Rumson, N.J.)
Filed Jan. 10, 1961, Ser. No. 81,721
20 Claims. (Cl. 244—12)

This invention relates to a new type of self-propelled aeronautical craft including a novel resonating pulse-jet engine whose gas diffuser surfaces constitute, outwardly, a boundary layer controlled wing, and inwardly, the fuselage or cellule of the craft. The interdependent functions of the engine and diffuser systems will be described separately hereinafter although both work according to common principles and on the same mass of air taken from the atmosphere.

The invention makes use of systems which increase the output of the fluid mass ejected, at the expense of its speed, without requiring extra power from the power plant, and without the use of moving parts. The transformation of the small flow of gas at high energy density outgoing from the explosion chambers into a large flow of gas of low energy density, bearing the aeronautical craft while flowing on the spreading surfaces, is made by two steps.

Broadly, the first step of the invention is performed in an accoustical resonator excited by the gases outgoing from the explosion chambers. In the resonator the speedy motion of gases along the system of ducts, guides, and nozzles thereof, generates suction, compression, and ejection effects, rather similar to those obtained by other means in turbo-jet engines through the use of rotor blades revolving in non-resonating gases. This process of transformation is slightly analogous to that used in an electric tuned circuit, when it is working as a transformer between the anode of a tube, where the A.C. voltage is high and the A.C. current small and a detector wherein the A.C. voltage is much smaller and the D.C. current as large as possible, assuming that there is some correspondence between voltage and current on one hand, and velocity and flow of mass on the other hand.

At the second step, the mass of gas is increased by the action of a boundary layer sucked and delivered by the previous system and trailing a larger mass of gas. At both steps, the inertia properties of gases, centrifugal force in a bent duct or braking force within a diffuser system, are used in order to carry away, through pulses of gases possessing a weak output and a very great energy density, a mass of air which possess a lower energy density but a much greater output wherein the quantity of energy present in the initially smaller mass of gas is diffused. The flux of air carried away can be called "secondary flux," or "dilution flux" as in the case of the "horn engine" of Henry Melot, and in other devices which followed. The advantage of this secondary flow is justified by the theory as follows: Let $M_1$ and $M_2$ be the flow of mass of two streams; $V_1$ and $V_2$ respectively their velocities. The outgoing flow of mass M is equal to the sum of the ingoing flows: $M=M_1+M_2$.

If the two entering flows are mixed without any loss of kinetic energy into small eddies in order to form a total homogeneous stream of velocity V in which the flow of kinetic energy is the sum of the flows of kinetic energy of the two entering streams, it may be written:

$$MV^2 = M_1V_1^2 + M_2V_2^2$$

From these relations is deduced the identity:

(1) $$\frac{MV}{M_1V_1+M_2V_2} = \sqrt{1+\frac{\frac{V_1}{V_2}+\frac{V_2}{V_1}-2}{\frac{M_1V_1}{M_2V_2}+\frac{M_2V_2}{M_1V_1}+2}}$$

which shows how is increased the total flux of momentum by mixing the two flows. It is maximum when the flow of momentum $M_1V_1$ and $M_2V_2$ of the primary and secondary streams are equal while their speeds $V_1$ and $V_2$ are as different as possible.

The thrust at a standstill of jet or rocket engines is equal to the flux of momentum. So in order to increase this thrust it is necessary to increase the total flux M by trailing a secondary flux as large as possible while V becomes smaller. If now the speed of the craft is taken into consideration, it can be shown that in order to obtain a maximum of thrust with a given amount of power the speed of the exhausted gases must be about twice the speed of the craft. This is the limit not to be exceeded when by adding of secondary flow, M increases while V decreases.

If the stream is a continuous one without discontinuity of the velocity, it is ruled by Bernoulli's theorem which says that the sum of the pressure and of the kinetic energy per unit of volume is constant. Knowing the pressure at the output it is possible to calculate the pressure at the input and to check that the work of the pressure is preserved and consequently the flow of total energy, which is the sum of both is preserved too.

But it is not the only case in which the flow of total energy is preserved. Thus, as an example, it is preserved if the pressure is constant everywhere, while the relations between the flow of mass and the velocities are the same as previously, but this case escapes Bernoulli's theorem and, consequently, the stream cannot be continuous, a wave shaped undulating motion being superimposed over the continuous motion, and may be termed the "dilution wave"; a precise relation may be given for the discontinuity of velocity between the two streams with reference to the radius of curvature of the input duct and the input, in order to obtain quickly the equalization of the energy per unit of volume in the two streams.

In a continuous stream encompassed by Bernoulli's theorem the flow of total energy in a stream tube is preserved, in the other case, by means of the dilution wave, a part of the total energy goes from a stream tube to another one in order to tend to the repartition expressed by Bernoulli's theorem while the superimposed undulating motion is stopped.

Such a distribution of the power into a larger flow of gas by means of a resonator and then the external walls of the craft itself, is not made in the pulsejet engines known prior to the invention where the gases are thrown from the explosion chamber into the atmosphere through a nozzle which is a circular pipe.

Illustrative of pulsejet engines known prior to the present invention is that employed in the German V–1 missile. This system comprises a duct having a valve bank of fluttering blades positioned at the air inlet orifice thereof. Disposed within the duct, interior to the aforesaid valve bank but near the air inlet orifice, is a fuel injector and a spark plug. When the mixture of fuel and air within this duct is exploded, the resulting hot gases are ejected through the unimpeded outlet orifice behind the chamber wherein the explosion occurs; gases are unable to leave the system through the inlet orifice because of the aforesaid valve bank. The inertia of the hot gases causes a low pressure area to develop within the duct where the explosion occurred and fresh air at atmospheric pressure to push through the valve bank permitting renewal of fresh air within the duct and the inception of another cycle of explosion, ejection, and the renewal of a low pressure area within the duct. Under the forced vibration of their operative state, the fluttering blades of the valve bank at the inlet orifice can sustain themselves for only a very limited period of time, however.

An improvement on this basic design was the subsequently devised "Escopette" engine system wherein use of the valve bank was obviated. In this system an aerodynamic valve was substituted for the aforesaid mechanical valve bank.

In both the V-1 and "Escopette" systems, the expelled gases are those outgoing from the combustion chamber; so that if for a given quantity of fuel the quantity of air admixed therewith is increased, the thrust per unit of delivered power is also increased. However, the thermodynamic efficiency decreases with the resulting changes in temperature. My invention removes these drawbacks.

The following terms will have the following recited meanings throughout the instant specification.

An "outlet power distributor" is a three terminal curved conduit in which primary and secondary streams, entering with different velocities respectively equal to $V_1$ and $V_2$ ($V_1$ being greater than $V_2$) are mixed in order to form the total output stream of which the velocity V is linked with $V_1$ and $V_2$ as defined in Formula 1 above.

An "inlet power distributor" is the reciprocal of the previous one, it is a three terminal curved conduit in which a total input stream of velocity V is divided into two output streams of different velocities $V_1$ and $V_2$ called primary and secondary streams respectively when $V_1$ is greater than $V_2$; the velocities $V_1$ and $V_2$, and V being associated in the manner described hereinabove.

The assembly of one inlet and one outlet power distributor is referred to herein as a pair of conjugate power distributors if the secondary flow outgoing from the inlet power distributor constitutes the secondary flow of the outlet power distributor after crossing through a bypass or lateral channel, while the primary flow going from the inlet to the outlet power distributor passes through a device which increases the flow of total energy without changing the flow of mass. The flow of total energy added in the primary stream goes out diluted in the total output stream.

Two pairs of conjugate power distributors are in series if the total input and output stream of the first pair constitutes the output and input primary stream of the second pair.

By putting in series several pairs of conjugate power distributors it is possible to distribute the flow of energy given by an engine into a flow of gas which becomes greater while the speed decreases.

The equilibrium between two continuous streams having no verticity, no divergence and no friction and flowing adjacent one another with a discontinuity of velocity along the interface is possible only if along the stream lines close to this limit the velocity is constant, since the pressure is constant as well, and without any discontinuity at the limit. Otherwise, small spinning eddies appear at once into which a large amount of kinetic energy is lost. But if the condition of equilibrium is satisfied, this equilibrium is unstable, and after a delay longer than precedingly an undulating motion appears which ensures an exchange of energy between the two streams in order to equalize the energy per unit of volume. In this case, the whole kinetic energy remains in a useful form. Consequently, the solid surface separating the two streams before they are projected must have its trailing edge on a stream surface designed in such a manner that for a continuous stream without any verticity and without any divergence, the velocity of gases along this stream surface is as constant as possible.

Because the flows of mass of the two streams (primary and secondary stream) outgoing from the inlet power distributor and entering the outlet power distributor are the same, it is possible to use the same geometry for both, but homothetic in such a manner that the product of the area of the cross-section by the speed through is the same in both cases. The speed is greater in the outlet power distributor than in the inlet one, and consequently, the cross-section is smaller. In the inlet power distributor the edge of the solid wall separating the two streams is down the stream after the critical curve.

Illustrative embodiments of the invention include, briefly, a U-shaped half-wave resonator excited by gases thrown out of an explosion chamber into the region of the resonator where the alternating velocity is maximum, utilizes the centrifugal force applied to the large mass of gases, oscillating inside the curved part of the U in order to control the boundary layer on the extrados of a wing. This flow crossing through the resonator constitutes the primary stream feeding a pair of conjugate power distributors. The forward part and rear part of the extrados work respectively as inlet and outlet power distributors. The total flow is trailed in the atmosphere and produces the lift.

In a second embodiment of the invention, a U-shaped half-wave resonator excited by shock waves coming from explosion chambers and reinforcing the alternating pressure in the two extremities of the resonator utilizes the centrifugal force in order to suck and throw a fluid stream which is the primary stream feeding the first pair or a series of conjugate power distributors. The last pair of conjugate power distributors is constituted by the input and output spreading surfaces which work respectively like inlet and outlet power distributors, trailing their total flow in the atmosphere and are integral parts of the aerofoil for the lift, while also constituting the upper wall of the craft.

A third embodiment of the invention differs from the second only in the shape of the resonator; instead of a U-shaped half-wave resonator a pair of straight quarter-wave resonators are utilized. The speedy motion of the gases along the blades near the output of the resonators produces an effect analogous to that produced with the help of centrifugal force in the curved part of the resonator of the previous systems. This latter embodiment while somewhat less efficient is more readily constructed.

The present invention, however, both as to its organization and mode of operation, together with further features and advantages thereof, may best be understood by reference to the following description taken in conjunction with the accompanying drawings, in which:

FIGURE 1 is a longitudinal sectional view, partially diagrammatic, of one embodiment of the present invention;

FIGURE 2 is a cross-sectional view along the lines 2—2 of FIGURE 1;

FIGURE 3 is an elevational view with portions cut away to show the interior of the combustion chamber and air-intake system in a modification of the invention;

FIGURE 4 is a cross-sectional view taken along the lines 4—4 of the air-intake system shown in FIGURE 3;

FIGURE 5 is a top-elevational view of an aircraft embodiment suitable for employment of the engine and diffusion system of the invention;

FIGURE 6 is a longitudinal sectional view of the aircraft embodiment of FIGURE 5;

FIGURE 7 is an elevational view of an engine and a portion of the diffusion system of the invention which is suitable for use in the aircraft embodiment of FIGURES 5 and 6;

FIGURE 8 is a cross-sectional view taken along the lines 8—8 of FIGURE 7;

FIGURE 9 is a cross-sectional view taken along the lines 9—9 of FIGURES 7 and 8;

FIGURE 12 is a longitudinal sectional view of a modification of the apparatus shown in FIGURES 5 and 6;

FIGURES 14 and 15 illustrate the stream lines of the average component of the velocity of the gases in the power distributors of the invention.

Figure 10:
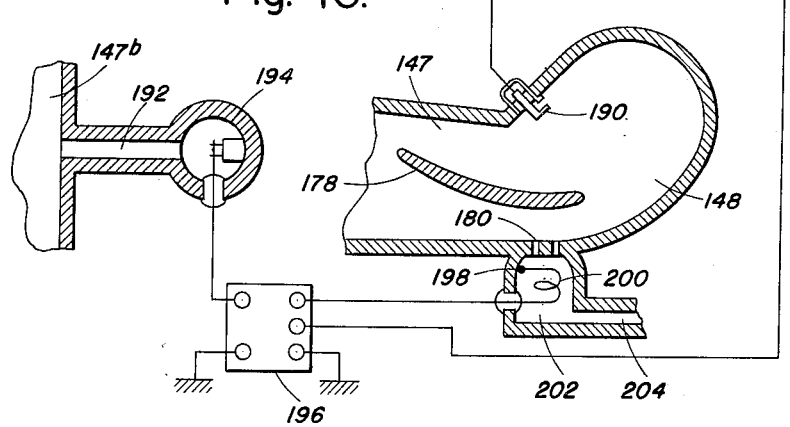
FIGURE 10 is an enlarged developed sectional and partially diagrammatic view of a detail of FIGURE 9.

Referring now more particularly to the drawings and with particular reference initially to FIGURES 1 and 2, there is shown the duct system of the first embodiment of the pulse-jet and diffusion system of the engine of the invention as applied to a wing structure. This duct system comprises an upper resonance chamber 2 and a lower resonance chamber 4; the assembly of both, through a bend, forms a U-shaped resonator 5 in which the resonating gas has a maximum alternating velocity in the most markedly curved portion thereof as described in detail hereinafter. The curved duct members 2 and 4 have disposed at their posterior terminal ends the pistons 6 and 8 respectively. These latter elements 6 and 8 are seated in airtight engagement with the interior walls of their respective chambers 2 and 4 and remain fixed in position when the engine is in operation; serving in this manner as the effective terminal ends of these chambers. The lower wall 10 of the upper chamber 2 (assuming, as shall be the case unless otherwise explicitly stated hereinafter that the wing structure is in horizontal position as shown in FIGURE 1), and the upper wall 12 of the lower resonance chamber 4 terminate at their forward positions substantially flush with the upper and lower ends of the air-intake chamber 14. Each of these walls 10 and 12 graduate in their substantially rectangular conformation at these termini so as to present the overlapping outer walls 16 and 18 respectively forming in turn the outer and forward ends 20 and 22 of the chambers 2 and 4 respectively. The arched outer wall 16 of the upper chamber 2 provides, in addition, the extrados of the upper wing 24. In its most forward position the wall 16 dips downwardly to its terminus 20 within the upwardly disposed terminus 22 of the lower chamber 4, forming thereby the conduit 25 which is an upward continuataion of the lower chamber 4. The end 22 of the wall 18 forming the outer border of the conduit 25 extends through the chamber 14 to a point above the conduit 14 in a substantially vertical manner. The exact disposition of this terminus 22 may be modified by hinged connection (26) thereof to the main body of the lower wall 18. Disposed across the conduit or chamber 14 is the curved duct 28 open at both ends and terminating at each end just exterior to the chamber 14 and within the confines of the resonator elements 2 and 4. The duct 28 is affixed at its upper and lower posterior ends to the walls 10 and 12 respectively of the aforesaid chamber. The duct 28 receives initially the gas expelled from the combustion chamber 30 through the curved conduit 32 which terminates in the orifice 34 which in turn communicates with the upper end of the duct 28; the forward and upper wall 36 of the conduit 32 being in fixed engagement with the forward concave surface of the wall 38 of the aforesaid duct 28. The remaining portion of the upper open end of the duct 28 communicates directly with the upper chamber 2. The lower end of the conduit 28 forms the nozzle 40. The combustion chamber 30 in each instance terminates rearwardly in the tapered extension 42 leading to the fuel-air mixture intake to be described hereinafter.

In order to reduce the noise produced by the gases pulsed by the engine and to effect convenient means for fueling and renewing the air in the combustion chamber, two resonators of the type shown in FIGURE 1 are normally used, both throwing their gases tangentially to the extrados of the same wing in alternate sequence. The flow of gas is thus substantially uninterrupted.

The two extensions 42 leading from the two combustion chambers 30 to the fuel-air intake are seen in FIGURE 3 in a plane perpendicular to that of FIGURE 1. In one of the chambers 30, of FIGURE 3, is shown, by way of illustration, a suitable ignition system for use in the combustion chambers 30 of the invention. This system involves a piston 44 compressed by a spring 46.

When the pressure in the combustion chambers 30 is sufficiently strong, an intermediate rod 48, by means of which displacement of the piston 44 is transmitted breaks the contact in the circuit breaker 50, cutting off the current from the battery 52 in the primary winding 54 of the induction coil 56. A strong voltage is thus induced within the secondary winding 58 of the induction coil 56 causing the spark plug 60 to ignite the fuel-air mixture transmitted to the combustion chambers 30 through the ducts 42. When at the beginning of engine operation, sufficient air is not being taken in through the air-intake aperture 67, an air compressor (not shown) may be employed to blow air through the duct 67 into the conduits 42 to the aforesaid chambers 30.

In FIGURE 3 the fuel intake 62 is shown positioned opposite to the fresh air intake located between the walls 66. These elements are seen in detail in FIGURE 4. The explosions occurring in alternate phase in the combustion chambers 30 resound in half-wave through the conduits 42 with a maximum of alternating velocity of the gases in the curved part of the duct. This velocity causes a centrifugal force which pushes the gases against the interior surface of the outer curvature and creates a low pressure zone at the fresh air intake. This fresh air intake communicates with the atmosphere through an aperture 67 in the lower surface of the wing as indicated in FIGURE 1. This intake aperture 67 and its associated apparatus may of course be suitably installed on the upper surface of the wing if desired. The flow of air crossing the aperture is, of course, that used for combustion of the fuel in the chamber 30. The power produced thereby is distributed in the greater flow of air which is sucked in simultaneously through the conduit 14 shown in FIGURES 1 and 2 and expelled by the conduit 25 as explained in detail hereinafter. The amount of air supplied through the ducts 42 will be sufficient for combustion alone but will not dilute the fuel mixture sufficiently for effective use in the pulsejet engines of the invention.

In the curved U-shaped duct or resonator 5 formed by the upper and lower resonance chambers 2 and 4 as seen in FIGURE 1, air and the combustion product emitted from the combustion chambers 30 oscillate; maximum alternating pressure from these gases is exerted at the posterior extremities of the chambers 2 and 4 delimited by the stationary pistons 6 and 8 respectively; a maximum alternating velocity being attained by these same mixtures in the forward portions of said resonator elements 2 and 4 as indicated by the numerals 70 and 72 adjacent the conduit 14, where the curvature of the elements 2 and 4 respectively is most marked. In this region the centrifugal force applied to the gases pushes them against the internal part of the curved walls 18, 20, and 22. When the gases are going from the chamber 4 to the chamber 2, a substantial volume thereof is thrown through the conduit 25 tangentially to the upper surface of the wall 16 which is a part of the extrados 24 of the wing.

The influx of fresh air necessary to compensate for the air expelled through the conduit 25 is sucked from the front part 9 of the extrados of the wing, and introduced through the air-intake conduit 14 into the posterior portion of the lower end 20 of the upper chamber 2 by virtue of the low pressure zone resulting from the centrifugal force pushing the gases against the inner surface of the arch or curvature 70 referred to above, as well as the tangential expulsion of gases through the diffluent jet passage 25. It is again noted that the dimensions of the outlet 25 may be varied by hinged movement of the outer terminal wall 2 of the lower chamber 4. By virtue of such an adjustment of the passage 25 diffluence of the volume of gas emitted therethrough may be substantially increased. The movement of this larger mass of air outward will occur at a decreased velocity. In this manner the transformation referred to hereinabove of a small concentration of gas possesssing a high energy density to be converted to a substantially larger mass of gas of a significantly lower energy density may be varied. The effect of this latter modification is analogous to that obtained by the variation of the inclination of the blades of the propellers in a helicopter. The flow of energy going out of the resonator with the expelled gases is at each period compensated by the flow of energy coming from the combustion chambers 30 with the gases thrown by the duct 32 tangentially to the forward wall 38 of the duct 28. The combustion products start from the chamber 30 with a pressure of about 4 to 6 atmospheres and after crossing through the duct 32, which is initially confluent or converging and then divergent or diffluent, arrive at the nozzle 34 with a velocity of a little higher than the velocity of sound and a pressure higher than that of the surrounding gas. The curved duct 28 works like a divergent duct, the forward and side walls of the duct 28 guiding the stream and the centrifugal force constituting the fourth wall. In this diffluent duct the gases expand pushing the air downwardly which was previously in the duct 28 and sucking the air from the rear portion of the upper resonance chamber 2. This is accomplished at the expense of the residual pressure, and the mass of gas so increased arrives at the nozzle 40 with a velocity approximately but somewhat less than the velocity of sound and a pressure close to that of the surrounding gas. Upon leaving the nozzle 40, the gases are guided on one side by the curved wall 12 of the resonance chamber 4 while on the other side the inertia expends them in less curved trajectories. This diffused spray presses violently upon the mass of gas present in the chamber 4 in front of the piston 8 and induces a suction which reinforces the oscillation of the gas in the U-shaped resonator 5. The gas then expands toward the output nozzle 25 and the upper chamber 2 where it is compressed against the inner surface of the piston 6. Expanding back toward the lower chamber 4, a portion of this gas crosses through the duct 28 where it is pushed again by a new pulse coming from the explosion chamber. In order to avoid a strong shock wave in the duct 28 it is necessary that the difference of velocity between the gases coming from the upper chamber 2 and the gases thrown by the nozzle 34 be less than the velocity of sound. This result is obtained by positioning the pistons 6 and 8 prior to operation of the engine in such a manner that the resonance has the same frequency as the explosions in the combustion chambers. When the aforesaid adjustments are made the flow of gas sucked in by the resonator 5 through the intake chamber 14 and thrown through the output conduit 25 is between ten and two hundred times greater than the flow of gas entering the air intake aperture 67 communicating with the combustion chambers 30 through the ducts 42. However, the flow of air removed in the atmosphere is more important than that crossing through the resonator; thus, when the low pressure in the intake chamber 14 sucks the gases from the atmosphere tangentially to the front portion 9 of the extrados of the wing, only a portion of the gases accelerated by going to a lower pressure enters the intake 14. While the velocity of the gases guided by the curved surface 9 of the extrados increases, the centrifugal force pushing the gases away from this surface increases too and a segment of the gases, after being accelerated, follow upon the extrados of the wing without entering the intake 14 because they are impeded by centrifugal force.

This system thus constitutes an inlet power distributor which is a part of a pair of conjugate power distributors. The total flow sucked upon the curved surface 9 is divided into a primary flow which enters the air intake 14 and a secondary flow which follows, and constitutes the secondary flow of the outlet power distributor.

The primary flow is thrown by the nozzle 25 tangentially to the curved upper surfaces 16 and 24 which bends it, creating a centrifugal force which causes it to be diffluent with a concomitant decrease in velocity and increase in pressure. The pressure reaches the equivalent of atmospheric pressure when leaving the terminal edge of the extrados 24, but is less than atmospheric along the surfaces 16 and 24, thus creating the requisite lift thereon. At the upper boundary of the primary jet this low pressure is trailing the secondary flow. When this secondary flow approaches the region of lower pressure it accelerates and it is impeded to press upon the primary jet by centrifugal force.

In both instances, at the inlet 14 and at the outlet 25, the force caused by the gradient of pressure inside the secondary stream functions in such a manner that the biggest component of this force is opposite to the centrifugal force while a minor tangential component accelerates the secondary flow.

It will be shown that an additional link between the different layers impeding them to slide one against the other is constituted by a wave.

The low pressure created upon the extrados 24 of the wing by the deflection of the primary jet sucked and thrown, and the increase of the flow of mass exhausted by trailing the secondary flow in the atmosphere are two aspects of the same phenomenon. The stream lines associated with this flow are considered hereinafter.

In a second embodiment of the invention, wherein the same process of trailing a secondary flow is employed, instead of using the extrados of the wings of an aircraft as a principal part of the diffuser and lift system as described above, the modifications appearing hereinafter include this function principally within the body of the aircraft, the upper surfaces of which are enlarged and function in a substantially equivalent manner to the extrados of the wing 24.

Instead of sucking and throwing the gases employed directly across the boundary layer as in the previous case described above, the engine controls this layer by means of conjugate power distributors. The engine itself utilizes a different mode of excitation of the resonance chambers forming the U-shaped resonator, which, rather than causing excitation by gaseous fluids of high velocity carrying away a secondary flow of initial lesser velocity, is excited by a pressure wave originating from one of the extremities of the resonator where the alternating pressure is the strongest. With reference to this embodiment of the invention and with particular reference initially to the diffusion system, and the novel aircraft wherein it is disposed, attention is directed to FIGURES 5 and 6. The pulse-jet aircraft of this aspect of the invention, which will be called "pulsoplane," is indicated in its entirety by the numeral 88. The pulse-jet engine for use therein (88) is indicated diagrammatically by the numeral 90. This element will be described in detail hereinafter. In the aircraft 88 as shown in FIGURES 5 and 6, the atmospheric air is drawn across the curved surface 92, on which the air drawn into the engine and diffusion system of the craft 88 forms a confluent stream, the lateral borders of the surface 92 being defined by the forward vertically disposed lateral fins 94.

This stream is in turn divided into two streams by the horizontally disposed plane 99, positioned between the lateral fins 94. The secondary stream crosses the upper surface of the plane 99 and the primary stream under the plane. Then gas is passed across the convex and diverging surface 102 which is bordered by the continuing vertically disposed side fins 94, which extend the length of the craft. As in the previous embodiment, the stream flowing upon the curved surfaces 92 and 102, and around the plane 99, constitutes a pair of conjugate power distributors. But the primary stream, instead of crossing the engine directly, is passed through a second pair of conjugate power distributors positioned in series with the first pair. The lateral channel of this second pair, through which the secondary stream is crossing, is the duct 96 located under the plane 99 between the vertically disposed fins 94. The primary stream goes to the engine 90 through the duct 98 and leaves the engine 90 through the duct 108.

In a pair of conjugate power distributors the flow of fluid mass of the total flow may be about three times the flow of mass of the primary stream, and consequently the flow of the secondary stream is doubled. So the flow of mass crossing through the duct 96 is about double that crossing through the ducts 98 and 108, and the jet sucked by 96 and 98, or thrown by 96 and 108, has a flow of mass about three times the flow crossing the engine 90. The total flow crossing upon the surfaces 92 and 102 is a further multiple of three and consequently nine times the flow of gas crossing through the ducts 98 and 108.

Outward of the craft the lateral fins 94 converge toward each other as they approach the horizontal plane 99 and diverge as they pass to the posterior end of the craft 88 where each contains, along its upper margin, the rudder 104 which is hingedly connected to the wall, or fin 94, along the vertical border 106 thereof for movement about a vertical axis. This movement will normally not exceed more than 45° from the plane defined by an extension in space of the fin 94 to which each rudder is affixed. The direction of the craft along a horizontal plane is thus controlled by these elements 104. The fluid stream then passes around the aileron, or airfoil 110. The airfoil 110 is disposed in a horizontal plane for maximum thrust along a horizontal plane and in substantially vertical position when maximum lift is desired for the aircraft 88. The airfoil 110 is a thin vane, made of three movable parts 110a, 110b, and 110c; the anterior flap 110a and the posterior flap 110c being hingedly connected along their rear and front borders respectively to the center flap 110b. In this way the concavity of the undersurface of the aileron may be regulated as desired. The aileron 110 is mounted on the interior sides of the posterior extensions of the fins 94 underneath the rudder elements 104 and is adapted for rotation around an axis defined by a line drawn between the two points of attachment. The undersurface 112 of the body 114, as seen in FIGURE 6 wherein is positioned the engine 90, defines a gentle concavity which serves to slow and diffuse the air passing thereunder. The undersurface 112 of the body 114 is continuous with the upper surfaces 92 and 102. The transformation from the under to upper surface is described by a smooth convex curvature in each instance. The fins 94 are continuous about the craft 88 and are parallel on the underside thereof from front to rear defining the lateral borders of the aforesaid undersurface 112 of the craft. At the standstill the air thrown under the craft by the effect of the airfoil 110 is again sent toward the inlet spreading surface by the effect of the airfoil 109. This latter element 109 is disposed about and removed from the forward curvature forming the nexus between the upper rearwardly converging surface 92 and the undersurface 112. It is supported by pairs of laterally positioned struts passing thereto from the lateral fins 94. These struts are adapted for adjustment in length so that the airfoil may be disposed at a varying distance from the main body 114. The airfoil 109 is normally disposed at an angle to both the horizontal and vertical planes, e.g. 45°, with its forward terminal end being curved upwardly toward the vertical. So the velocity of the air crossing upon the spreading surfaces is increased, without requiring any extra power from the power plant. In order to keep the pressure under the plane at a value close to atmospheric, the air stream in this region must be as slow as possible. When the horizontal speed of the craft increases the distance between the airfoil 109 and the body of the craft is reduced and it becomes close, one against another for horizontal flying. The engine 90, the rudders 104, the front airfoil 109, and rear airfoil 110 are connected in a standard manner to a control unit in the body 114, wherein suitable provision is made for a pilot.

Wheel devices 136, for movement of the craft 88 along the ground, may be attached thereto in any suitable manner. Thus, a single wheel 136 may be employed in front, attached to the base 112 of the body 114, and bordered laterally by the airfoil 109; and two wheels attached in conventional manner to the base of the fins 94 below the rear end of the body 114 and forward of the airfoil 110.

Figure 11:
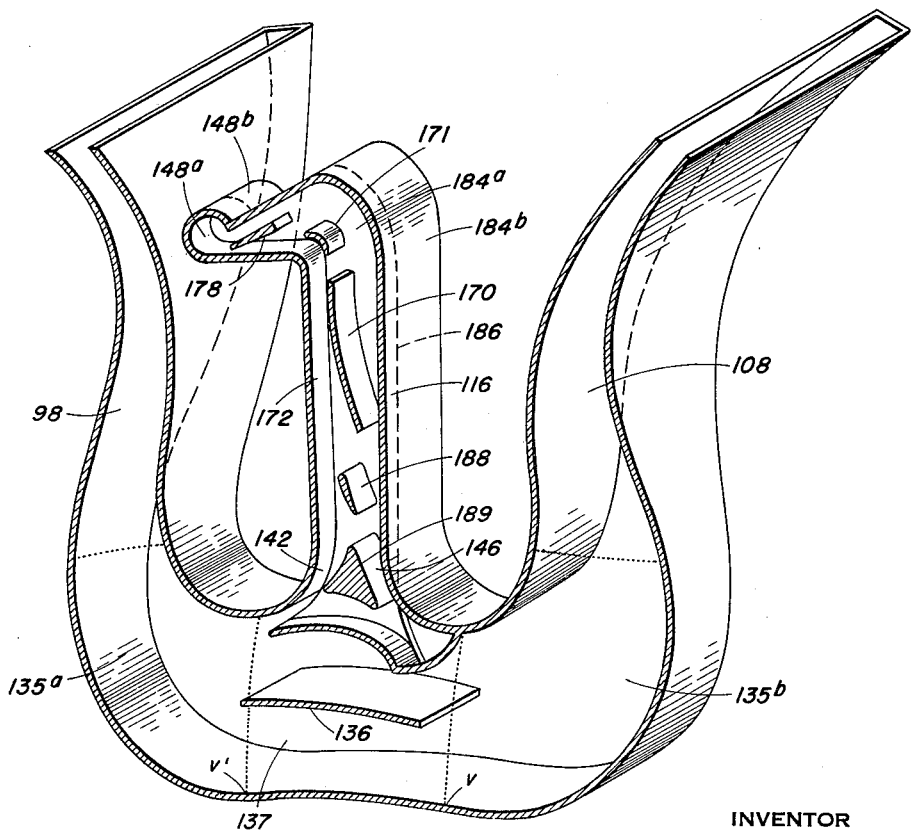
FIGURE 11 is a modification of the engine and diffusion system shown in FIGURE 7 shown partly in cross-section and partially in elevational view.

Suitable pulse-jet engines for use in the craft 88 indicated diagrammatically in FIGURE 6, by the numeral 90, are shown in detail in FIGURES 7 to 11 inclusive. The system includes the upwardly tapered curved ducts 98 and 108, the former (98) being the air-inlet duct and the latter (108) the ejection duct for the combustion product and air mixture; the engine itself 90 positioned in a plane perpendicular to the plane of symmetry of the craft, as seen in the cut-view of the preferred embodiment shown in FIGURE 9; and positioned between the ducts 98 and 108 and the engine 90 itself, a series of three pairs of conjugate power distributors which are shown in a preferred embodiment in the cut-view of FIGURE 8. The tapered ducts 98 and 108 of FIGURES 7, 8, and 11 are those indicated in FIGURE 6 by the same identifying numerals. The variation in cross-sectional area along the lengths of each of these tapered ducts is small. The variation in the cross-sectional dimensions are, however, great. Thus adjacent the external diffusion surfaces 92 and 102, the dimensions of the ducts 98 and 108 respectively, perpendicular to the plane of symmetry thereof, are greater in relation to the dimensions in the plane of symmetry; while at the lower termini of these same ducts 98 and 108 these dimensions have undergone a graded transition so that the dimension of each duct perpendicular to the plane of symmetry is equal to, or slightly smaller than, the dimension in the plane of symmetry. The relation of the cross-sectional areas of the ducts 98 and 108 is in inverse proportion to the velocity of the gases passing therethrough.

Coming from the duct 98 the fluid stream passed from the surface 92 enters the inlet power distributor 135a where it is divided into two streams by the partition 136. The secondary flow, after crossing through the lateral channel 135c, enters the outlet power distributor 135b; the primary stream passing along the upper side of the partition 136 entering the second inlet power distributor 137a where it constitutes the total stream and then is divided again into two streams by the second partition 138. The secondary stream, passing along the underside of the partition 138, crosses through the lateral channel 137a and enters the outlet power distributor 137b which forms a second conjugate system with the inlet distributor 137a.

The new primary stream passing over the second partition 138 enters the inlet power distributor 139a where it constitutes the total stream and then is divided into two streams by the third partition 140. The secondary stream, after crossing the lateral channel 139c, enters the outlet power distributor 139b which forms a third conjugate system with the inlet power distributor 139a. The primary stream, passing over the third partition 140, enters the duct 142 which leads to the input of the engine proper, into which it is drawn and from which it is sequentially expelled at a higher speed through the duct 146 to become the primary stream of the output power distributor 139b of the third conjugate distributor system. The total stream outgoing from 139b constitutes the primary stream of the output distributor 137b, and the total stream outgoing from the distributor 137b constitutes the primary stream of the distributor 135b of which the total stream is thrown into the duct 108. In this manner the engine proper controls the air crossing the ducts 98 and 108 through the series of three pairs of conjugate power distributors thus described. The borders or limits of the aforesaid conjugate power distributors are indicated for convenience by dotted lines in the accompanying drawings. It will be noted that as every conjugate pair of distributors multiplies the flow of fluid mass by three, the power delivered by the engine proper into one cubic meter of gas will be distributed into 27 cubic meters of gas crossing through the ducts 98 and 108.

The engine proper 90, of which FIGURE 9 illustrates a cut-view of a preferred embodiment, is constituted by a U-shaped resonator excited by two explosion chambers and contains stationary blades or vanes for the transformation of the alternating motion of the gases into a continuous flow, and for the renewal of air in the explosion chambers. The engine thus comprises the resonator 147, formed of the elements 147a, 147b and 147c, and the combustion chambers 148a and 148b. The common conduit or element 147c is seen to have the guide vanes 166 and 168 adjacent its upper and lower margins as well as the inlet duct 142 and the outlet duct 146 respectively. The elements 147a, 147b and 147c form the U-shaped resonator. In this modification of the invention, the elements 147a and 147b are disposed in a plane perpendicular to the plane of symmetry of the tapered ducts 98 and 108. The aforesaid elements, 147a and 147b, may be quadrilateral, e.g. rectangular or rounded, or cylindrical; the latter construction being preferred.

In FIGURE 9 arrows indicate the motion of the gases passing through the bend 147c from the conduit or resonance chamber 147a of the resonator to the conduit 147b. A part of the air pushed out of conduit 147a goes between the blades 168a to the duct 146. No gas flows between the blades 168b, however, at this time; the gas remaining being drawn into the upper extremities of the chamber 147b and the explosion chamber 148b. A portion of the gas so drawn into the conduit 147b is sucked thereinto from the duct 142 passed the blades 166b. No gas flows between the blades 166a because the gases passing the lower extremity of these latter blades push in opposite directions. Half a period of resonance later all the speed vectors if drawn would be seen to be symmetrical with respect to the axis of symmetry of FIGURE 9, but always a flow of gas is sucked from 142 and thrown through 146.

In accordance with another characteristic of the invention, the separating vanes 170 and 171 (FIGURE 9) divide each of the resonator chambers or conduits 147a and 147b and the respective entrances to the explosion chambers 148a and 148b into two parts, which, for a certain length, look like two assembled ducts, 172 and 174, one of which (172) converges toward its upper end to present a smaller cross-section than at its lower end, and the other of which 174 is diffluent and divergent, to provide a large cross-section towards its upper end. This device plays an important role for the renewal of the gases sucked into the distal end of the resonator as well as into the terminal end of the explosion chamber. As a matter of fact, when gases enter with an equal speed into two apertures of same section, the volume of gas which enters in both are equal. Consequently, in the instant system, with particular and illustrative reference to the resonance chamber 147b, the gas which enters through the confluent duct 172, the cross-sectional area of which decreases toward its upper end later on occupies the distal portion of the resonance chamber 147b, while during the same period of time the gas which enters through the diffluent duct 174, the cross-section and area of which becomes greater toward its upper end, occupies only a portion of the duct 174, and thus the gases at low pressure which occupy the resonator 147b prior to a renewed influx of gases thereinto, are then found in the region marked with small dots in FIGURE 9. The flow of air within the resonator 147b is indicated by the arrows in this same figure. This air renewal system is accentuated by the fact that when entering the resonator the fluid flow is faster when entering the duct 172 than when entering the duct 174. This disposition favors the ejection of the gases of the explosion which move at a greater speed when they leave the duct 174. At the entrance of the combustion chamber 148b, the vane 178 plays a role similar to that of the vanes 170 and 171 inside the resonator 147b. The gases coming in, to fill the combustion chamber 148b enter through the confluent part, and, before reaching the combustion chamber, pass in front of the injector 180 which vaporizes them with fuel. As soon as the combustion chamber is filled to the correct pressure, as shall be explained hereinafter, the spark plug 190 (FIGURE 10) ignites the mixture.

It is evident that the efficiency can fall rapidly if the injection and the firing are not perfectly timed, and that is why an electronic system of command of this operation is preferred, although mechanical systems like the one described with the first embodiment of this application can be used also.

In order to electronically command the injection and the firing systems, the invention utilizes the following device: a small duct 192 put in communication by pressure with, for example, the resonance chamber or conduit 147b of FIGURE 9, and a small cavity 194 as seen in FIGURE 10, in which there is placed a piezoelectric body which transforms the pressure oscillations into alternating voltage. This alternating voltage is amplified, then dephased as needed, and is transformed into pulses that activate thyratrons, which in turn command the injection process and the firing process. All this is obtainable through well-known electronic systems as indicated diagramatically by the numeral 196 in FIGURE 10.

According to another characteristic of the invention, the injection process is obtained by volatilization of the fuel under the effect of a brief and intense current which heats rapidly the resistance 200, bringing about consequently the volatilization of the fuel around it, the largest part of which is ejected in the process. The fuel is brought up in a continuous manner by the very small diameter duct 204. As soon as the fuel-air mixture reaches the plug 190, the latter fires it. At the time of the explosion, with a proper mixture of a conventional fuel normally employed in pulse-jet engines, a temperature of about 2000° C. is obtained, and a shock wave starts which has a speed in excess of twice the speed of sound. It is necessary to correctly diffuse this pressure as soon as possible upon a section of the resonator. For this purpose there is employed that portion or section of the distal part of each of the resonance chambers 147a and 147b between the points indicated by the numerals 206 and 208, as seen illustratively in FIGURE 9, having a shape approximately that of a parabolic mirror. The focus of this section is situated at the exit of the explosion chamber at the point indicated by the numeral 210; the direct rays going from the point 210 to the point 208 being essentially perpendicular to the axis of the resonance chamber 147b. The system of walls that bounds laterally this wave while it is moving toward the "mirror," as well as the "mirror" itself, forms a unit analogous to the units called "horn-mirrors" and utilized in centimetric wavelength communications systems. The shock wave which is spread out in this manner and which encounters in defining its passage, gases already thrown away by the resonator, ceases to be a pressure discontinuity and communicates all of its energy to the gases already in motion, in a smooth manner. The engine system will operate as soon as a first explosion is produced. This initial explosion is achieved by known and conventional means.

According to a third embodiment of the invention shown in FIGURE 11, instead of a U-shaped resonator, it is possible to use two straight resonators. In this case, the oscillation of pressure at the bottom of the resonator is less strong and, consequently, the efficiency is reduced, but the engine is more simply constructed, as seen in FIGURE 11. Thus, in this embodiment, the two straight resonators 184a and 184b are disposed in parallel alignment with one another and separated by the interface 186. These resonators work in opposite phase. The structure of these resonators 184a and 184b at their distal ends, where the pressure is the greatest, is the same as that of the distal ends of the resonance chambers 147a and 147b of the embodiment shown in FIGURE 9. For this reason like numerals indicate functional and structural equivalents of these two illustrative embodiments, i.e. FIGURES 9 and 11.

The embodiment of the invention shown in FIGURE 11 differs particularly from that of FIGURE 9 in that region of each of the twin resonators wherein the velocity of the gas is greatest. In this latter embodiment this occurs not at a bend as in the resonance chambers of the apparatus described hereinabove but at that point at which the vane or blade 188 is positioned. Thus, in the device of FIGURE 11 the input conduit 142 and the output conduit 146 are positioned close together and the aerodynamic action of the blade 188 pushes towards the output 146 the gases accelerated by the explosion. When the resonator 184a is drawing air in, fresh air enters therein through the duct 142, while in the duct 146 air moves no more because it is sucked on one side by the resonator and on the other side by the effect of the flow of gas thrown out by the resonator 184b into the duct 146. This latter duct present, of course, in each of the identical resonators works as a diffuser system, the two ducts and their orifices being positioned close to each other, with the result that the gases moving at a greater velocity entrain and draw in those gases moving at a lesser velocity.

The aforesaid embodiments are illustrative of the present invention and it will be apparent that other embodiments within the scope and spirit thereof may be had.

For example, instead of one resonating engine, two or more may be employed, which communicate directly with the duct or conduit 142 as seen, for example, in FIGURE 8, drawing air therefrom and likewise expelling gases into the conduit 146 as shown in the same figure. In this case, a more continuous flow is obtained if the explosions occur at set intervals of time and in mixed sequences. Further, in order to generate the electric current needed for the electronic device a turbo-fan, placed inside the air intake, or the output nozzle of the engine, may be used to drive an electric generator.

A still further variation which provides for an increase in the horizontal speed after lift of the aircraft of the invention is shown in FIGURE 12 wherein there is effected conveniently and rapidly the interchange operation between the diffusion system described hereinabove, and as seen in FIGURES 5 and 6, and that of a direct or conventional jet. As seen in FIGURE 12, provision is made for a duct 120 through which the resonator device of the engine 90, represented diagrammatically in the aforesaid FIGURE 12, draws in and expels gases as a conventional jet engine. The duct 120 defined through the lower central length of the body 114 for use as an air-intake and exhaust conduit in operation of the jet engine, is adapted to be opened as, for example, by means of the doors 122 and 124. These door elements are most desirably opened just prior to closure of the doors 126, 128, 132 and 134 which occlude the passages 96, 98, and 108 thus shutting off the action and passage of gases through these ducts 96, 98, and 108 and thus providing an exterior which is aerodynamically more desirable for operation of a conventional jet engine.

Other modifications of the invention are also possible. Thus, it is noted, in addition, that the airfoil 99, of FIGURE 5, may be desirably extended laterally to provide a conventional wing structure on either side of the aircraft 88. This structure lends stability to the aircraft in flight. Such wing extensions are required in the embodiment of FIGURE 12 when the pulsejet functions in the manner of a conventional jet system as referred to above.

The engine and diffusion systems described hereinabove may be employed in a variety of different aircraft and in the body or wing structure thereof; such as the delta wing or those of more standard construction.

The apparatus of the present invention, exclusive of the combustion chambers and accompanying resonators, can be made of various materials since secondary gaseous flows are always large and of comparatively low energy density and therefore normally proceed at a temperature low enough to allow the use of some plastic materials such as, for example, Fiberglas (trade name). The combustion chambers and resonators are, however, normally of metallic construction.

The following discussion which relates to the diffusion and engine system of the embodiment of the invention is further illustrative thereof.

Figure 13:
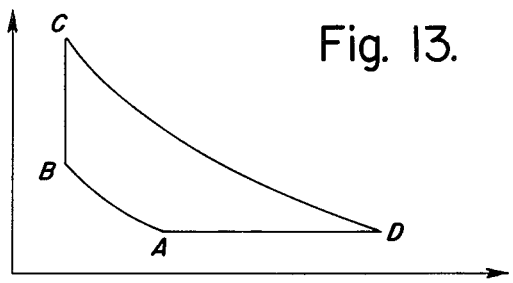
FIGURE 13 illustrates the thermodynamic cycle of the gas in a combustion chamber of the type shown in the detail of FIGURE 10.

The pulse-jet engine employed for purpose of this example resonates at 50 periods per second and has a dual set of combustion chambers and resonators. The formula which provides for determination of the diffusion system will be recited hereinafter. The full thermodynamic cycle of explosion and expansion of the gases in the combustion chamber is seen in FIGURE 13.

The thermodynamic efficiency is determined by the following formula:

$$(2) \quad E = 1 - \gamma \frac{T_A}{\Delta T}\left[\left(\frac{\Delta T}{\Delta_B}+1\right)^{1/\gamma} - 1\right]$$

and the work per cycle is:

$$(3) \quad W + E \cdot \frac{P_B V_B \Delta T}{(\gamma - 1) T_B}$$

with $$T_B = T_A \eta^{\frac{\gamma-1}{\gamma}}$$

wherein:

$T_A$ is the absolute temperature of the atmosphere;

$\Delta T$ is the temperature increase at the time of explosion in the combustion chamber, e.g. 1,800° C.;

$\eta$ is the compression ratio defined in terms of the ratio between the pressure existing before the explosion (see point B of FIGURE 13) and the lowest pressure possible (i.e. point A of FIGURE 13);

$\gamma$ is the ratio between the heat capacity at constant pressure and the heat capacity at constant volume; (for air this value is 1.4)

When the compression ratio $\eta$ is equal to 1, the efficiency calculated by Formula 2 is 40%; when the ratio reaches 3, the efficiency reaches 54%. In the less preferred instances, where $\eta=1$, the pressure $P_B$ is equal to the pressure of the surrounding atmosphere $P_A$ and the temperature $T_B$ is equal to the ambient temperature $T_A$. Under these conditions, the volume $V_B$ of one of the explosion chambers can be calculated, it being noted that a complete unit composed of two explosion chambers giving 100 explosions per second must produce the 2,500 kg.×m./sec. required at the output. Formula 3 above gives a value of 400 cm.³ for the volume of the explosion chamber. The weight of the air ejected per second by the combustion chambers is one hundred times the mass contained within one chamber or 40 grams. The weight of the fuel is about 7 percent (%) of this weight, or about 3 grams per second or 11 kilograms per hour. This theoretical figure supposes the fuel to be completely exhausted without loss, and the friction to be negligible. Each cycle yields 25 kg.×meter and the mass of air which can utilize this energy to enter the resonator at 200 meters per second, and exit at 280 meter/second, is 12.5 grams. The resonator should contain two or three times this weight, of air, i.e. a volume of 25 to 40 liters. For a frequency of 50 periods one-half wave is slightly shorter than 3 meters, therefore, the U-shaped resonator 147 is, in each instance, 3 meters long. The straight portions of said resonators 147 are 1 meter long, and the curved portions thereof have a breadth of 1 meter. The total section of a resonator must consequently be about 2.5 to 4 square decimeters. The duct 142 as seen in FIGURE 9 through which passes 12.5 grams of air at 200 m./sec. during a quarter of a period or 1/200 of a second, has a section of 1.25 square decimeters, and the duct 146 passes an equivalent mass of gases during the same period of time at a speed of 280 m./sec., and has a section of about 0.9 square decimeter.

Other fields with a nil divergence are, for example, the electrostatic field from the charges and the magnetostatic field from the currents. The sum of several fields of vectors with a nil divergence is a field having, itself, a nil divergence. Still further examples similar to those had in electrostatic theory and magnetostatic theory are the constant field having the same value in all points of space; the field radial from a point and proportional to the inverse of the square of the distance to the point, which is that produced by an electric charge; the field radial from an axis or orthogonal to this axis and proportional to the inverse distance from said axis; the field orthogonal to an axis and proportional to the inverse of the distance from a given point of this axis and proportional to the sinus of the angle, at this given point, of the direction of the point where the field is considered with the axis (this field is analogous to the magnetic field created by a very short element of D.C. current but such an element cannot exist alone, in electromagnetic theory); the field orthogonal to an axis and proportional to the distance from said axis. The field proportional to the distance from the axis has no electromagnetic equivalent; it is the field of speed vectors of the rotation of the solid. This field which also has a nil divergence may be one of the fields, the sum of which forms the field of speed vectors of a gas inside a curved duct such as the resonators 147 of FIGURES 8 and 9; but unlike the other illustrative fields recited above in which the curl is nil, the curl in this latter instance is constant at a non-nil value; and for this reason, and since a non-nil curl generates eddies; requires avoidance of this field. The constant field can, however, be the field of velocity of the points of the still atmosphere in relation to a mobile object moving through such an atmosphere.

An analysis of the field of velocity of air around the vehicle or aircraft 88 of FIGURES 5 and 6, for example, can be made by reference to and analogizing from the following electrostatic fields: (a) the field originating from a group of positive charges placed at the bottom of the ejection duct 108; (b) the field originating from a group of negative charges placed at the bottom of the intake duct 98; (c) the field analogous to the one originating from a group or ensemble of elements of current perpendicular to the plane of symmetry and forming a rather thick screen between the two groups of positive and negative charges above-mentioned in (a) and (b); and finally, a constant field.

This analysis of the field of speed in a complex case would require that the stream lines be determined with a sequential determination among them of the boundary surface or layer which would thereafter be formed about the surface of the body of the vehicle; a subsequent calculation of the pressure in all points, and a deduction from this of the lift power. Here, as examples, and in order to demonstrate the effectiveness of the system of the invention, are shown relatively simple instances. For this purpose the lift power of a cylindrical surface will be defined precisely, and will yield an initial approximation of the type of diffusion surfaces utilized by the invention and specifically the diffuser portion of the engine-diffuser unit of the pulsejet aircraft illustrated in FIGURES 5, 6 and 12 inclusive or the extrados of the wing illustrated in FIGURE 1.

Figure 14:
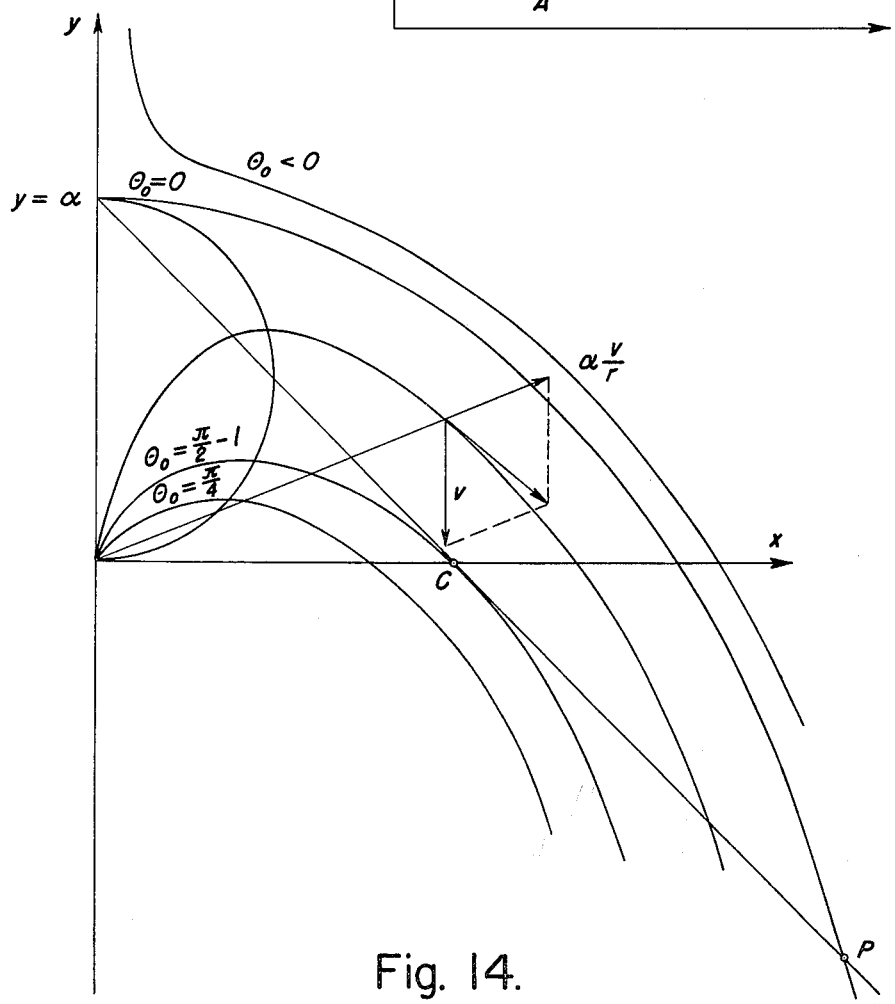

Referring to the Cartesian coordinates $xyz$ of FIGURES 14 and 15 and to the associate cylindrical coordinates, $r\theta z$, where $r$ is the distance to $oz$ and $\theta$ the azimuth in the plane $oxy$ from $oy$, the speed of the fluid is everywhere parallel to the plane. It is the sum of a constant vector $oxy$ parallel to $oy$, directed toward the negative values of $y$, and with radial and orthogonal vectors equal respectively to $$\frac{\alpha V \cos \beta}{r}$$

and $$\frac{\alpha V \sin \beta}{r}$$

$r$ being the radial cylindrical coordinate of the considered point; $\alpha$ being a length modulus; $\beta$ being a given constant angle; $V$ being a speed modulus equal to the modulus of the constant vector parallel to $oy$; $u$ will be the speed of the fluid on a given point; and $\rho$ will be the density of the air.

The stream lines may be readily determined from the expressions of the projections of the speed on $ox$ and on the normal to the radius.

(5) $$\frac{dx}{dt} = \frac{\alpha}{r} V (\cos \beta \sin \theta + \sin \beta \sin \theta)$$

(6) $$\frac{r d\theta}{dt} = V \sin \theta + \frac{\alpha}{r} V \sin \beta$$

The quotient member to member gives the differential equation:

$$\frac{dx}{d\theta} = \frac{\alpha (\cos \beta + \sin \beta \cotg \theta)}{1 + \frac{\alpha \sin \beta}{r \sin \theta}}$$

But reciting that $x$ is equal to $r \sin \theta$ this equation may be written:

$$\left(1 + \frac{\alpha \sin \beta}{x}\right) \frac{dx}{\alpha} = (\cos \beta + \sin \beta \cotg \theta) d\theta$$

which integrates immediately as:

$$\frac{x}{\alpha} + \sin \beta \log \frac{x}{\alpha} = (\theta - \theta_0) \cos \beta + \sin \beta \log \sin \theta$$

and when replacing $x$ by its expression $r \sin \theta$, the polar equation of the stream lines is obtained:

(7) $$f(r, \theta) \equiv \frac{r \sin \theta}{\alpha \cos \beta} + tg \beta \log_e \frac{r}{\alpha} - \theta + \theta_0 = 0$$

The curves corresponding to this equation are drawn for the case $\beta$ nil as shown in FIGURE 14 and $$\beta = \frac{\pi}{3}$$

in FIGURE 15.

The expression of $r$ as an explicit function of $\theta$ may be obtained only when $\beta$ is nil but a result may be obtained without solving the Equation 7.

From the Equations 5 and 6 may be deduced the coordinates $r = \alpha$, $\theta = -\beta$ of the point of stagnation, where the speed is nil, and where the following loci cross.

The locus of the points where the speed is parallel to $oy$; it is the straight line $\theta = -\beta$ or $\pi - \beta$; on this locus the speed is $$u = V \left(1 \mp \frac{\alpha}{r}\right)$$

The locus of the points where the speed is radial; it is the straight line $x = -\alpha \sin \beta$; on this locus the speed is $$u = V \frac{\sin (\theta + \beta)}{\sin \beta}$$

The locus of the points where the speed is parallel to $ox$; it is the circle: $r = \alpha \cos (\theta + \beta)$; on this locus the speed is $u = V \, tg \, (\theta + \beta)$.

The locus of the points where the speed is perpendicular to the radius; it is the straight line: $y = \alpha \cos \beta$. The stream line for which the value $\theta_0$ is:

(8) $$\theta_0 = tg \, \beta - \beta$$

has a double point in the point of stagnation. This curve is the limit between the spiral-like stream lines starting from the origin like exponential spirals and the curves going from infinite to infinite.

From the geometrical definition of the speed vector may be deduced the value of the square of its modulus:

(10) $$u^2 = V^2\left[1 - 2\frac{\alpha}{r}\cos(\theta+\beta) + \frac{\alpha^2}{r^2}\right]$$

The isobar curves are the loci of the points where the the pressure is the same but with regard to Bernouilli's theorem, they are also the loci of the points where $u^2$ has a constant value. Referring to the previous equation, the loci of points describe circles orthogonal to the circle of which the diameter extends between the origin of the coordinates and the point of stagnation. They are circles because the term or the second degree in $r$ is independent of $\theta$. These circles are centered on the straight line $\theta = -\beta + k\pi$ because the equation is invariable if $\theta$ takes values symmetrical with respect to the value $-\beta$. On this straight line the two points where the circle, corresponding to a given value of $u$, crosses, are defined by the value of $r$:

$$1 - \frac{\alpha}{r} = \pm\frac{u}{V}$$

By elimination of $u/V$ between the two possible values of $r$, indicated by the symbols $r_1$ and $r_2$, there is obtained the relation:

$$\left(r_1 - \frac{\alpha}{2}\right)\left(r_2 - \frac{\alpha}{2}\right) = \frac{\alpha^2}{4}$$

of which the geometrical interpretation is the orthogonality of the circles announced above.

The locus of the points where the speed along a stream line is maximum or minimum is given by:

$$0 = \frac{d(u^2)}{d\theta} = \frac{\partial(u^2)}{\partial r}\frac{\partial f}{\partial \theta} - \frac{\partial(u^2)}{\partial \theta}\frac{\partial f}{\partial r}$$

where $f$ is the function (7) defining the stream line. This equation may be written:

$$\frac{\alpha^2}{r^2}\cos\beta - 2\frac{\alpha}{r}\cos\theta + \cos(2\theta+\beta) = 0$$

If all the trigonometric expressions are put down as functions of the trigonometric expressions of $\beta/2$ and $$\left(\theta + \frac{\beta}{2}\right)$$

this equation appears to be the product of the two following equations:

(11) 
$$r\cos\left(\theta + \frac{\beta}{2} - \frac{\pi}{4}\right) - \alpha\cos\left(\frac{\beta}{2} + \frac{\pi}{4}\right) = 0$$
$$r\cos\left(\theta + \frac{\beta}{2} + \frac{\pi}{4}\right) - \alpha\cos\left(\frac{\beta}{2} - \frac{\pi}{4}\right) = 0$$

which represents two straight lines crossing both through the point of stagnation ($r = \alpha\theta = -\beta$) and then respectively through the points $x = \alpha$, $y = 0$ and $x = -\alpha$, $y = 0$.

Such are the lines which separate the region where the stream is diffluent and that where the stream is confluent. Along these lines the speed is:

(12) $$u = V\frac{\sin(\theta+\beta)}{\cos\left(\beta + \frac{\pi}{4}\right)}$$

In order to get the critical stream line, i.e. that which is tangent with the one of the lines defined by (11), there is replaced in the general Equation 7 of a stream line the value of $r/\alpha$ given by the chosen Equation 11. Thus, there is obtained a $\theta$ equation, the roots of which are the azimuths of the points of intersection of a given stream line with the chosen line defined by (11). These curves are tangent if one root is double, i.e. if the derivative and the function are nil at the same time. It leads to the condition:

(13) $$\theta_0 = \frac{\pi}{2} - \frac{1-\sin\beta}{\cos\beta} - \beta - \text{tg }\beta \log_e\left(\frac{1-\sin\beta}{\cos\beta}\right)$$

and for the contact point:

(14) 
$$\theta = \frac{\pi}{2} - \beta$$
$$r_c = \alpha\, \text{tg}\left(\frac{\pi}{4} - \frac{\beta}{2}\right)$$

Along the radius going from the origin to this contact point the velocity is:

(15) $$u = V\sqrt{1 + \frac{\alpha^2}{r^2}}$$

The angle of this radius with the speed vector is:

$$\frac{\pi}{4} + \frac{\beta}{2}$$

The critical surface which separates the primary and the secondary jet is a cylinder with its generatrices parallel to $oz$, the basic curve being defined by the Equation 7 where $\theta_0$ has the value defined by (13). The solid surface separating the two jets must stop up the stream a little before the contact point defined by (14). The other boundaries must be calculated considering that the two jets must have about the same flow of momentum.

As a first approximation if it is assumed that in the jet the angle of the speed vector with the radius stays close to $$\left(\frac{\pi}{4} + \frac{\beta}{2}\right)$$

the flow of momentum through a cross-section near the contact point may be expressed by:

(16) $$\int \rho u^2 \cos\left(\frac{\pi}{4} + \frac{\beta}{2}\right) dr = \rho V^2 \cos\left(\frac{\pi}{4} + \frac{\beta}{2}\right)\int\left(1 + \frac{\alpha^2}{r^2}\right) dr$$

This integral is taken between the values $r'$ and $r_c$ for the primary stream and between $r_c$ and $r''$ for the secondary stream. Considering the value (14) of $r_c$, the equality of the two flows of momentum may be written:

(17) $$\left(\frac{r'}{\alpha} - \frac{\alpha}{r'}\right) + \left(\frac{r''}{\alpha} - \frac{\alpha}{r''}\right) = -4\,\text{tg}\,\beta$$

If the value $r''$ of $r$ at the upper boundary of the secondary stream is given the Equation 17, it provides the design of the value $r'$ of $r$ at the lower boundary of the primary stream.

In order to get the values $\theta_0'$ and $\theta_0''$ characteristic of the boundary stream lines, $\theta$ is replaced in Equation 7 by its value (14) and $r$ by its value $r''$ or $r'$. Thus, there results the relations:

(18) 
$$\theta_0' = \frac{\pi}{2} - \beta - \frac{r'}{\alpha} - \text{tg }\beta \log_e\frac{r'}{\alpha}$$
$$\theta_0'' = \frac{\pi}{2} - \beta - \frac{r''}{\alpha} - \text{tg }\beta \log_e\frac{r''}{\alpha}$$

Thus, there are known the boundary stream lines of the output power distributor defined by the Equation 7 in which $\theta_0$ takes the values $\theta_0'$, $\theta_0''$ given by (18) or the value $\theta_0$ given by (13) at the limit between the jets. The inlet cross-section is that containing the critical curve, i.e. the straight line parallel to $oz$ and crossing through the point (14). The outlet cross-section after which the secondary stream is everywhere diffluent may be defined like that containing the intersection of the upper boundary of the secondary stream (Equation 7 in which $\theta_0$ has the value $\theta_0''$) with the locus of the maximum of speed given the first Equation 11.

All the previous equations become much more simple when $\beta$ is nil.

The Equation 7 may be written:

(19) $$r = \alpha \frac{\theta - \theta_0}{\sin \theta}$$

The value of $\theta_0$ corresponding to the critical stream line, Equation 13, is now:

(20) $$\theta_0 = \frac{\pi}{2} - 1 = 0.57 \text{ radian}$$

The stream line according with $\theta_0 = 0$ (condition (8) of the general case) starts from the stagnation point $y = \alpha$ $x = 0$ and separates the curves ($\theta_0 > 0$) starting from the origin toward the direction of the azimuth $\theta_0$ and becoming then asymptotic to the straight lines $x = \alpha(\pi - \theta_0)$ for $y$ infinite negative from the curves ($\theta_0 < 0$) going from the $y$ infinite positive where they are asymptotic to the straight lines $x = \alpha(\pi - \theta_0)$. Note that in the general case, when $\beta$ is not nil there is no asymptotic straight line.

The value of $\theta_0$ corresponding to the critical stream line, Equation 13, is thus again:

(20) $$\theta_0 = \frac{\pi}{2} - 1 = 0.57 \text{ radian}$$

and the coordinates of the critical point (14) become:

(21) $$\theta = \frac{\pi}{2}$$
$$r_c = \alpha$$

The Equation 17 may be put down as:

(22) $$r'r'' = \alpha^2$$

and taking in consideration (19) and (21) this leads to:

(23) $$\left(\frac{\pi}{2} - \theta_0'\right)\left(\frac{\pi}{2} - \theta_0''\right) = 1$$

As an example: if for the upper boundary of the secondary stream the value $\theta_0''$ nil is chosen, the value of $\theta_0'$ will be $$\theta_0' = \frac{\pi}{2} - \frac{2}{\pi} = 0.83 \text{ radian}$$

So the secondary flow comprises the stream lines for which $\theta_0$ is between 0 and 0.57 radian and the primary flow, the stream lines for which $\theta_0$ is between 0.57 and 0.87 radian. But $\theta_0$ is, near the origin, the azimuth of the departure of the corresponding stream line, and the flow of mass of a stream is proportional to the angle of its boundary curves near the origin. So the flow of mass of the secondary stream is $$\frac{0.57}{0.83} = 68\%$$

of the total flow of mass. Since the flow of momentum of the primary and secondary flow are equal, the ratio of their flow of kinetic energy is the inverse of the ratio of their flow of mass. So the primary stream carries 68% of the total flow of kinetic energy and 32% of the total flow of mass. When $\beta$ is no more nil but has a positive value, as for example $\pi/3$, this ratio increases and it is possible to carry 80% or more of the flow of kinetic energy in the primary stream, and 20% or less of the flow of mass.

The inlet cross-section is that containing the critical curve, i.e. the straight line parallel to $oz$ crossing through the critical point (21).

The out-let cross-section is that where the secondary stream is everywhere diffluent. The Equations 11 of the lines separating the diffluent and confluent region become in the present case:

(24) $$r(\cos \theta \pm \sin \theta) = \alpha$$

The first one (sign +) cuts the upper boundary stream line ($\theta_0'' = 0$) on the point:

$$\begin{cases} \theta = 2.04 \text{ radian} \\ r = 2.08 \alpha \end{cases}$$

The outlet cross-section must contain this point.

The force applied by the stream on the walls of a power distributor can be expressed as the difference of the vectorial flows of momentum at inlet and at outlet.

The spreading surfaces have been considered as a particular case of power distribution for which the upper boundary of the secondary stream is rejected to infinity ($\theta_0'' = -\infty$) but in this case the Formula 23 is no more valid. It is more practical to do a direct calculation of the force applied to the spreading surface by the low pressure resulting from Bernoulli's theorem, as follows:

Let, $p_a$ be the atmospheric pressure; $u_a$ be the speed of the fluid at the trailing edge when the pressure is $p_a$; and $p$ and $u$ be the pressure and the speed in the boundary layer at any given point.

The components of the applied force per unit of length in the direction $oz$ are then:

(25) $$Fy = \int (p_a - p) dx = \frac{\alpha}{2} \rho V^2 \int \left(\frac{u^2 - u_a^2}{V^2}\right) \frac{dx}{\alpha}$$

(26) $$Fx = \int (p_a - p) dy = \frac{\alpha}{2} \rho V^2 \int \left(\frac{u^2 - u_a^2}{V^2}\right) \frac{dy}{\alpha}$$

Remembering the Formulas 19 and 10 where $\beta$ must be nil, it is possible to write:

(27) $$\frac{u^2}{V^2} = \left(\frac{\sin \theta}{\theta - \theta_0}\right)^2 - \frac{2 \sin \theta \cos \theta}{\theta - \theta_0} + 1$$
$$x = \alpha(\theta - \theta_0)$$
$$y = \alpha(\theta - \theta_0) \cot \theta$$

and then the integrals (25) and (26) can be solved by the following formulae:

(28) $$-\frac{\sin^2 \theta}{\theta - \theta_0} = \int \left[\left(\frac{\sin \theta}{\theta - \theta_0}\right)^2 - \frac{2 \sin \theta \cos \theta}{\theta - \theta_0}\right] d\theta$$

(29)
$$-\frac{\sin \theta \cos \theta}{\theta - \theta_0} + 2 \log_e \frac{\sin \theta}{\theta - \theta_0}$$
$$= \int \left[\left(\frac{\sin \theta}{\theta - \theta_0}\right)^2 - \frac{2 \sin \theta \cos \theta}{\theta - \theta_0}\right]\left(\cot \theta - \frac{\theta - \theta_0}{\sin^2 \theta}\right) d\theta$$

As an example: a curve corresponding to the Formula 19 with a value $$\theta_0 = \frac{\pi}{4}$$

of the parameter is chosen for the base curve of the cylinder used as an output spreading surface. The trailing edge of the plane guiding the upper boundary of the jet is on the critical surface for which $$\left(\theta_0 = \frac{\pi}{2} - 1\right)$$

and ends a little up the stream before the critical curve which is the straight line according with Equation 21. Let the trailing edge of the plane separating the jet, be upon the line of the spreading surface according with $$\theta = \frac{\pi}{3}$$

and let the trailing edge of the spreading surface itself be the line according with $$\theta = 3\frac{\pi}{4}$$

The previous formulae give for the applied force per unit of length along $oz$ the following value:

$$Fy = 1.28 \alpha \rho V^2$$
$$Fx = 1.01 \alpha \rho V^2$$
$$F = \sqrt{Fy^2 + Fx^2} = 1.86 \alpha \rho V^2$$

This force is perpendicular to the chord of the arc of which the coordinates of the extremities are such that:
$\Delta x = 1.31 \alpha$; $\Delta y = 1.72 \alpha$ and consequently $$\Delta L = \sqrt{(\Delta x)^2 + (\Delta y)^2} = 2.15 \alpha$$

In order to obtain the maximum of lift force, this chord must be horizontal.

For a further illustrative and numerical example, the following values are had:

$$V=25 \text{ m./sec.} \qquad \alpha=2 \text{ m.} \qquad \Delta z=2 \text{ m.}$$

Again employing the previously recited formulae, a lift force of 460 kg. is obtained. It is this force which is applied to the output spreading surface. The force applied to the input spreading surface is not very different. The force applied upon the plane 99 as seen in FIGURES 6 and 12 located between the two spreading surfaces is $\frac{1}{2}\rho S u^2$. Where the value of $u^2$ is arrived at by means of Formula 27 in which $$\theta = \frac{\pi}{2}$$

and $$\theta_0 = \frac{\pi}{2} - 1$$

so that $u=V\sqrt{2}$. If the area of this plane is $S=3$ m.², the force is 250 kg. The total lift force is thus: 1,170 kg.

The air actually thrown or projected as a primary stream or trailed as a secondary stream is that corresponding to the stream lines of which the parameter $\theta_0$ is positive and smaller than the parameter $\theta_0$ of the lower boundary of the primary jet. The power necessary to increase the velocity of this stream from $\theta$ to V is:

(30) $$W = \frac{1}{2}\rho \alpha \Delta z \theta_0 V^3$$

wherein from the data given hereinabove, it is known that W equals 2,500 kg. m./sec.

As another example, if, instead of a field of speed vectors parallel to a plane, as alluded to hereinabove, a field of speed vectors of revolution around an axis $oy$ is considered by the addition of a constant field parallel to the axis and a field radical from a point and proportional to $1/r^2$, a calculation parallel to that described above, may be developed referring to spherical coordinates, $r$ being the radius and $\theta$ being the colatitude or the Cartesian coordinates, $oy$ being the axis of revolution and $ox$ being in the meridian plane in which the calculus is employed.

The polar equation of the stream lines is now:

(35) $$r^2 = 2\alpha^2 \frac{\cos \theta_0 - \cos \theta}{\sin^2 \theta}$$

wherein $\cos \theta_0$ is a constant which may be greater than one. If $\cos \theta_0$ is between $-1$ and $+1$, $\theta_0$ is real and the corresponding stream lines start from the origin in the direction of which the angle with $o$ axis is $\theta_0$. These stream lines become incurved, moving toward the negative $y$ where they become asymptotical to the straight lines according to the formula:

(36) $$x = \alpha \sqrt{2(\cos \theta_0 + 1)}$$

If $\cos \theta_0$ has a value greater than one, the stream lines coming from the infinite toward the positive $y$, where they are asymptotical to:

(37) $$x = \alpha \sqrt{2(\cos \theta_0 - 1)}$$

pass around the other stream lines and tend asymptotically toward the straight lines defined by (36) for the negative $y$. If after defining the velocity along a stream line; and the derivative thereof is taken as nil; the loci of the maximum and minimum velocities are obtained which separate the regions where the stream lines are confluent and those where they are diffluent. The equations of these loci are expressed as follows:

(38) $$\alpha^2 = r^2 \left( \cos \theta \pm \frac{\sin \theta}{\sqrt{2}} \right)$$

It is noted that the two resulting curves start from the point of stagnation, and then become asymptotic to the straight lines:

$$\theta = \pm \arctan \sqrt{2}$$

On these loci the expression of the velocity is:

(39) $$u = V \sqrt{\frac{3}{2}} \sin \theta$$

The critical stream line is that corresponding to the value $\pi/4$ of $\theta_0$. It is tangent to the locus (38) (where a plus sign is used) at the critical point of which the coordinates are:

(40) $$\theta = \frac{\pi}{2}$$
$$r = 2\frac{1}{4}\alpha = 1.19\alpha$$

The critical surface is the surface generated by the critical stream line turning around $oy$ and the critical curve is the circle generated by the critical point at the same time. Along this circle which is in the plane $xoz$, the angle of the speed vector with $oy$ is $\gamma$ so that:

(41) $$\text{tg } \gamma = \sqrt{2} \text{ or } \gamma = 0.955 \text{ radian}$$

In this plane $xoz$, the speed is given by the equation:

(42) $$\frac{u^2}{V^2} = 1 + \frac{\alpha^4}{r^4}$$

So the flow of momentum between two circles centered on $o$ is given by the indefinite integral:

$$\rho V^2 \cos \gamma \int 2\pi r \left(1 + \frac{\alpha^4}{r^4}\right) dr = 2\pi \rho V^2 \cos \gamma \left[\frac{r^2}{2\alpha^2} - \frac{2\alpha^2}{r^2}\right]$$

Taking in account the value (40) of $r$ on the critical circle, and the values $\theta_0'$ and $\theta_0''$ of the other boundaries of the primary and secondary stream which may be expressed as functions of $r^2/2\alpha^2$ (Equation 40) where $\theta$ equals $\pi/2$, the equality of the two flows of momentum may be written:

(43) $$\left[\cos \theta_0' - \frac{1}{\cos \theta_0'}\right] + \left[\cos \theta_0'' - \frac{1}{\cos \theta_0''}\right] = -\sqrt{2}$$

If $\theta_0'' = 0$, this equation gives $\cos \theta_0' = 0.517$ or $\theta_0' = 1.027$ radian.

Around the origin the component of the speed independent of $r$ is negligible and the flow of mass through the cone of angle $\theta$ is proportional to $\cos \theta$. This flow of mass is preserved along the stream tubes. Thus, the ratio between the secondary flow of mass and the total may be written:

(44) $$\frac{\cos \theta_0'' - \cos \frac{\pi}{4}}{\cos \theta_0'' - \cos \theta_c'} = 0.67$$

Consequently, the primary stream carries 33% of the total flow of mass and 67% of the total flow of kinetic energy.

The intersection of the stream line defined by (35) where $\theta_0$ has the value $\theta_0'' = 0$ with the curve defined by (38) separating the diffluent and confluent regions is given by:

(45) $$\theta = 2\gamma = 1.91 \text{ radian}$$
$$r = \alpha\sqrt{3}$$

The outlet cross-section must contain this circle.

It is also possible, of course, to obtain the expression of the lift force by means of elementary functions, but the formulae then involved involves a degree of complexity not had, for example, in Formulae 27 and 28 above.

It is obvious that all that has been said for the field of revolution described above, remains true, for a sectoral portion limited by two planes containing the axis of revolution.

For a more general example, if instead of a constant field and a radial or orthogonal field, two radial, or orthogonal, fields were had in relation to two parallel straight lines, or two points, the stream lines may be calculated in a manner similar to that described above. This is begun by recording the expressions of the components of the speed, perpendicular to the vector originating from the two poles, and the member-to-member quotient of these expressions, taking into consideration the trigonometric relations of the triangle which leads immediately to the equations of the stream lines.

For the most complicated examples and embodiments, it should be noted that it is possible with the help of magnetic fields, to construct a field of vectors simulating the field of speed under study, and to trace with iron powder, according to well-known techniques, the magnetic field lines which can simulate the stream lines.

In the previous analysis the stream is assumed to be a continuous one, consequently ruled by the Bernoulli's theorem and thus the sum of the pressure and of the kinetic energy per unit of volume is constant everywhere. The flow of total energy is the product of this sum (or Bernoulli's sum) by the flow of volume (or flow of mass divided by the density). In a pair of conjugate power distributors the flow of total energy of the primary stream is increased by the engine, and thus in the power distributors there appears a discontinuity of the Bernoulli's sum between the primary and secondary streams. This discontinuity is a discontinuity of velocity because a discontinuity of pressure in a fluid is impossible here. Consequently, the critical surface separating the two streams is a vortex sheet, where the verticity is infinite, while elsewhere it is zero.

Such a stream is unstable, oscillations appear and Bernoulli's theorem is no longer valid. The average stream does not change very much, the stream lines concerning the continuous component of the velocity are these analyzed previously, but around this average motion is an alternative motion the stream lines of which look like the lines of magnetic field of a $TE_{10}$ electromagnetic wave in a rectangular wave guide or better in a rectangular curved horn. The curved walls of the power distributor correspond to the walls of the guide parallel to the electric field. Along these walls the alternating velocity on one hand and the alternating magnetic field on the other hand are parallel to the wall. But in the region where the critical surface is the alternating velocity of the fluid has a component perpendicular to the critical surface. The flow of energy crossing through the critical surface is equal to the integral along this surface of the average value of the product of this component of the alternating velocity by the alternating pressure at the same place. This exchange of energy brakes the primary stream and accelerates the secondary stream. This action of braking or accelerating is actually made in a manner analogous to this one used in the traveling wave tube or in linear accelerators. In the first case the axial component of an electromagnetic wave increases its own power by braking a continuous current and, in the second case, the axial component accelerates the continuous current of particles by giving them the power carried by the wave.

It is so in the two streams of the power distributor: in the primary stream the component of the alternating velocity parallel to the continuous stream brakes it. The power taken from this continuous stream by the wave is radiated through the critical surface as recited hereinabove and increases the power of the component which accelerates the secondary stream. In this way the total power is distributed into the two streams in such a manner that the repartition of the velocity tends to the one expressed by Bernoulli's theorem. The necessary conditions to do so are the ones given hereinabove when defining the power distributors.

When two pairs of conjugate power distributors are in series, the walls at the junction thereof are tangent.

All that has been said about the power distributors and their assembly is as true in hydrodynamics as well as in aerodynamics because of the hypothesis of an incompressible fluid. In the former case, a conventional centrifugal pump replaces the engine proper. The series of pairs of conjugate power distributors transform the small output of high velocity water stream thrown by the pump into a much larger output and lower speed water stream.

This study demonstrates how the geometry of the power distributors must be designed, that is how the critical stream surface separating the primary and secondary streams, the boundary stream surfaces and the inlet and outlet cross-section, are designed. It is true for aerodynamic or hydrodynamic devices and it is shown how an aircraft can be built which flies without any moving piece and a steamer without any propeller.

It is noted that the term "speed of sound" as employed throughout this specification refers to the velocity of sound under the prevailing conditions. It is noted further that the examples and embodiments disclosed herein as well as the hypothesis elucidated, while cited for purposes of clarity and detail, are not to be considered limitative of the products and processes envisaged by and encompassed within the purview of the present invention.

What is claimed is:

1. A pulse-jet engine and diffuser system which comprises an air-intake conduit; concavo-convex resonance chambers adapted to form a resonator entering opposite sides of said conduit; said chambers extending outwardly from said air-intake conduit in such a manner that the concave surfaces of said chambers are in spaced opposite relation to each other; said resonance chambers being closed at the terminations thereof removed from said air-intake conduit; the outer convex wall of the first of said chambers terminating within the aforesaid air-intake conduit; the outer convex wall of the second of said resonance chambers passing transversely through said air-intake conduit and overlapping the outer convex wall of said first resonance chamber to describe a jet nozzle terminating at a point removed from said air-intake conduit in such a manner that a gaseous flow expelled through said jet will move outwardly adjacent to the outer surface of the convex wall of the first of said resonance chambers; fuel-combustion means and means for introducing the resulting combustion product therein into the second of said resonance chambers at a transverse angle to the outer wall thereof on its concave inner surface.

2. A pulse-jet engine and diffuser system which comprises an air-intake conduit, concavo-convex resonance chambers adapted to form a resonator entering opposite sides of said conduit; said chambers extending outwardly from said conduit in a substantially common plane of symmetry, and in such a manner that the concave surfaces of said chambers are in spaced apposite relation to each other; said resonance chambers being closed at the terminations thereof remote from said air-intake conduit; the outer convex wall of the first of said chambers terminating within the aforesaid air-intake conduit; and the outer convex wall of the second of said resonance chambers passing transversely through said air-intake conduit and overlapping the outer convex wall of said first resonance chamber to describe a jet nozzle terminating at a point removed from said air-intake conduit and at an angle substantially perpendicular to the plane of entrained air moving into said air-intake conduit; and in such a manner that a gaseous flow expelled through said jet defines a gaseous boundary stream on the outer convex surface of the first of said resonance chambers; a combustion chamber; fuel feeding and ignition means positioned in said combustion chamber; and means for conveying a fluid stream from said combustion chamber to the second of said resonance chambers and introducing said gaseous mixture therein at an angle transverse to the outer wall thereof on its concave inner surface.

3. A pulse-jet engine and diffuser system that comprises an air-intake conduit; concavo-convex resonance chambers adapted to form a resonator opening into opposite sides of said conduit; said chambers extending outwardly from said air-intake conduit in a substantially common plane of symmetry; and in such a manner that the concave surfaces of said chambers are in spaced apposite relation to each other; the curvature of said resonance chambers being greater near their open frontal terminations; means adapted to occlude the posterior end of each of said resonance chambers and to simultaneously adjust the distance between the posterior end of the interior of each of said chambers and the frontal orifices thereof; the outer convex wall of the first of said chambers terminating within the aforesaid air-intake conduit; and the outer convex wall of the second of said resonance chambers passing through said air-intake conduit and overlapping the outer convex wall of said first resonance chamber to describe a jet nozzle terminating at a point removed from said air-intake conduit; and disposed thereat in such a manner that a gaseous flow expelled through said jet defines a gaseous boundary stream on the outer convex surface of the first of said resonance chambers; a combustion chamber; fuel feeding and fuel ignition means disposed in said combustion chamber; and means for conveying a fluid stream from said combustion chamber to the second of said resonance chambers and introducing said gaseous mixture therein at an angle transverse to the outer wall thereof on its concave inner surface.

4. A pulse-jet engine and diffuser system that comprises an air-intake conduit; concavo-convex resonance chambers adapted to form a resonator opening into opposite sides of said conduit, said resonance chambers extending outwardly from said air-intake conduit in a substantially common plane of symmetry; and in such a manner that the concave surfaces of said chambers are in spaced apposite relation to each other; the curvature of said resonance chambers being greater near their open frontal terminations; means adapted to occlude the posterior end of each of said resonance chambers and to simultaneously adjust the distance between the posterior end of the interior of said chamber and the frontal orifices thereof; the outer convex wall of the first of said chambers terminating within the aforesaid air-intake conduit; and the outer convex wall of the second of said resonance chambers passing through said air-intake conduit and overlapping the outer convex wall of said first resonance chamber to describe a jet nozzle terminating at a point removed from said air-intake conduit; and disposed thereat in such a manner that a gaseous flow expelled through said jet defines a gaseous boundary stream on the outer convex surface of the first of said resonance chambers; said outer convex surface constituting a portion of and being continuous with the remainder of the extrados of an aircraft wing structure wherein said engine and diffuser system are positioned; means for adjusting the cross-sectional dimensions of the orifice of said jet; a combustion chamber; fuel feeding and ignition means positioned therein; and means for conveying a fluid stream from said combustion chamber to the second of said resonance chambers and introducing said gaseous mixture therein at an angle transverse to the outer wall thereof on its concave inner surface.

5. A pulse-jet engine having first and second systems, each of which comprises a resonator; means for introducing air into said resonator; a combustion chamber; means connecting the interiors of said resonator and said combustion chamber; means adapted to draw into said combustion chamber a portion of the amount of air by volume drawn into said resonator; and means for expelling a portion of the gases from said resonator and said combustion chamber onto an upper and outer lift surface, the engine further comprising a duct passing between the combustion chambers of each of said systems; and a single fuel-injection and air-inlet means provided in said duct for supply of air and fuel to each of said combustion chambers.

6. An aircraft suitable for activation by a pulse-jet engine and diffuser system; said craft comprising a body; said body having an under surface describing a concavity from the anterior end to the posterior end of said body, an upper anterior convex air-intake diffuser surface and a convex upper posterior fluid-ejection diffusion surface; each of said anterior and posterior upper surfaces being continuous with the corresponding anterior and posterior portions of the aforesaid under surface; an air-intake duct; said duct extending between said upper anterior diffuser surface and the diffusion system of a pulse-jet engine supported within the body of said aircraft; a fluid ejector duct positioned behind said air-intake diffuser duct; said ejector duct extending from the diffusion system of said engine, communicating therein with the aforesaid air-intake diffusion duct; to the upper posterior diffusion surface and continuous therewith; an additional air diffusion duct positioned at substantially the level of the upper anterior and posterior diffusion surfaces and defining a passage directly therebetween; the upper wall of said latter duct being provided by an airfoil disposed horizontally over the body of said craft and supported by lateral fins; said fins being positioned on each side of said craft and extending the length thereof; and providing the lateral borders for each of the upper anterior and posterior diffusion surfaces.

7. An aircraft suitable for activation by a pulse-jet engine and diffusion system; said craft comprising a body; said body having an under surface describing a concavity from the anterior end to the posterior end of said body; an upper anterior convex air-intake diffuser surface and a convex upper posterior fluid-ejection diffusion surface; each of said anterior and posterior upper surfaces being continuous with the corresponding anterior and posterior ends of the aforesaid under surface; an air-intake duct extending between said air-intake diffusion surface and a pulse-jet engine mounted in the aforesaid body; said duct being disposed at the rear of said air-intake surface and continuous therewith; a fluid ejector diffusion duct positioned behind said air-intake duct; said ejector duct extending between the diffusion system of said engine and said upper posterior diffusion surface; an additional air diffusion duct positioned at substantially the level of the upper anterior and posterior diffusion surfaces and defining a passage directly therebetween; the upper wall of said latter duct being provided by the under surface of an airfoil; the longitudinal dimension of said duct and said airfoil being defined by the air-intake and fluid ejector duct orifices communicating with the aforesaid diffusion surfaces; said airfoil being supported by fins mounted on both sides of said body; said fins extending the length of said body; corresponding downward extensions of said fins defining the lateral borders of the under surface of said body and the upper air intake and fluid ejector diffusion surfaces; said fins further defining rearwardly directed extensions on each side of said aircraft body; and ailerons mounted thereon and therebetween for directing the flight of said craft.

8. An aircraft as described in claim 6, said craft having mounted therein, in addition, a jet engine; and air-intake and exhaust conduits extending through the body of said craft and communicating with said jet engine; said engine system being adapted for discrete operation with relation to the pulse-jet engine and diffusion system mounted in said craft.

9. An aircraft as defined in claim 6 wherein the air-intake diffuser duct and fluid ejector diffuser duct thereof communicate with each other and with a pulse-jet engine comprising dual explosion chambers and a resonator composed of dual resonance chambers, each of said resonance chambers terminating in each of said explosion chambers, each of which contains firing means; fuel injection means being positioned in each of said resonance chambers adjacent to each of said explosion chambers; said explosion chambers being positioned remote from the communication of said resonance chambers with the aforesaid diffuser ducts; and so disposed in said resonator that a shock wave emanating from each of said explosion chambers will initially contact the adjacent interior side walls of each of said resonance chambers.

10. A pulse-jet engine and diffuser system comprising dual combustion chambers and a resonator composed of dual resonance chambers, and a common conduit; each of said combustion chambers being positioned at the free terminal end of each of said resonance chambers; said resonance chambers arising from the opposite sides of said common conduit with which each resonance chamber defines a continuous passage; said resonance chambers being curved at and adjacent to their terminal ends distal to said common conduit in such a manner that shock waves emitted from each of said combustion chambers contacts initially the interior concave segment of the corresponding resonance chamber wall, each of said resonance chamber walls describing a concavity identical to that of a parabolic mirror; means in communication with said common conduit positioned between and continuous with said resonance chambers for diffusiong air into said resonator and combustion chambers from the atmosphere and for transmitting air through a bypass channel removed from said resonator; and means for removing said air and the combustion products emitted from said combustion chambers through said resonator to an exterior diffuser lift surface.

11. A pulse-jet engine and diffuser system comprising dual combustion chambers and a resonator composed of a common conduit and dual resonance chambers; each of said combustion chambers being positioned at the free terminal end of each of said resonance chambers, fuel injection means positioned in each of said resonance chambers adjacent to each of said combustion chambers; ignition means positioned in said combustion chambers for periodic firing of air and fuel conveyed to said chambers from said resonance chambers; said resonance chambers arising from the opposite sides of said common conduit with which each resonance chamber defines a continuous passage; said resonance chambers being curved at and adjacent to their terminations in the combustion chambers in such a manner that shock waves emitted from each of said combustion chambers contacts initially the interior concave segment of the corresponding resonance chamber wall; each of said resonance chamber walls describing a concavity identical to that of a parabolic mirror; means in communication with said common conduit positioned between and continuous with said resonance chambers for diffusing air into said resonance chambers and combustion chambers from the atmosphere and for transmitting air through a bypass channel removed from said resonator; and means for removing said air and the combustion products emitted from said combustion chambers through said resonator to an exterior diffuser lift surface.

12. A pulse-jet engine and diffuser system comprising dual combustion chambers and a resonator composed of dual resonance chambers and a common conduit; each of said combustion chambers being positioned at the free terminal end of each of said resonance chambers; fuel injection means positioned in each of said resonance chambers adjacent to each of said combustion chambers; ignition means positioned in said combustion chambers for periodic firing of air and fuel conveyed to said combustion chambers from said resonance chambers; said resonance chambers arising from the opposite sides of said common conduit with which each resonance chambers defines a continuous passage; said resonance chambers being curved at and adjacent to their terminations in the combustion chambers in such a manner that shock waves emitted from each of said combustion chambers contacts initially the interior concave segment of the corresponding resonance chamber wall; each of said resonance chamber walls describing a concavity identical to that of a parabolic mirror; said resonator and combustion chambers being disposed in a common plane of symmetry; said common conduit positioned between and continuous with said resonance chambers being in communication with an engine air renewal inlet duct at one end and an engine fluid ejection duct system at its opposite end; each of said engine inlet and ejector diffuser duct systems being composed of conjugate inlet and outlet power distributors, respectively; said power distributors being continuous with an air-diffuser inlet conduit and a gaseous diffusion ejector conduit, respectively; said conduits communicating directly with lift surfaces exterior to said engine and diffuser system; and a bypass channel positioned between said power distributors and removed from said resonator and combustion chambers.

13. A pulse-jet engine and diffuser system comprising dual combustion chambers and a resonator composed of dual resonance chambers and a common conduit; each of said combustion chambers being positioned at the free terminal end of each of said resonance chambers; fuel injection means positioned in each of said resonance chambers adjacent to each of said combustion chambers; ignition means positioned in said combustion chambers for periodic firing of air and fuel conveyed to said chambers through said resonance chambers; said resonance chambers arising from the opposite sides of a common conduit with which each resonance chamber defines a continuous passage; said resonance chambers being curved at and adjacent to their terminations in the combustion chambers in such a manner that shock waves emitted from each of said combustion chambers contacts initially the interior concave segment of the corresponding resonance chamber wall; each of said resonance chamber walls describing a concavity identical to that of a parabolic mirror; said resonance chambers and combustion chambers being disposed in a common plane of symmetry; said common conduit positioned between and continuous with said resonance chambers being in communication with an engine air renewal inlet duct system at one end and an engine fluid ejection duct system at its opposite end; each of said engine inlet and ejector diffuser duct systems comprising a plurality of conjugate inlet and outlet power distributors, respectively; said power distributors being continuous with an air-diffuser inlet conduit and a gaseous diffusion ejector conduit, respectively; said conduits communicating directly with lift surfaces exterior to said engine and diffuser system; and a plurality of bypass channels positioned between each of said power distributors and removed from said resonance chambers and combustion chambers; each of said channels being adapted for the transmission of air directly from a corresponding inlet power distributor to a corresponding outlet power distributor.

14. The pulse-jet engine and diffuser system of claim 13 wherein said resonator and combustion chambers are disposed in a plane substantially transverse to that of said bypass channel, power distributors and engine and diffuser inlet and ejection ducts.

15. A pulse-jet engine and diffuser system comprising dual resonators and dual combustion chambers; each of said combustion chambers being positioned at the free terminal ends of said resonators; fuel injection means positioned in each of said resonators adjacent to each of said combustion chambers; ignition means positioned in said combustion chambers for periodic firing of air and fuel conveyed to said chambers from said resonators; each of said resonators defining a continuous passage with a diffusion system composed of an air renewal inlet conduit system and a fluid ejection system; said resonators and combustion chambers being separated by a solid interface; said resonators being turned at and adjacent to their terminations in the combustion chambers in such a manner that shock waves emitted from each of said combustion chambers contacts initially the interior concave segment of the corresponding resonator wall; each of said resonator walls describing a concavity identical to that of a parabolic mirror; guide vanes positioned at the junction of said resonators and said air-inlet and injection systems; said vanes being adapted to entrain a portion of the air transmitted from said air-inlet system into said resonators as a primary fluid flow and to convey the remainder of said air through a system of bypass channels to the air-ejection system as a secondary fluid flow; said air-inlet conduit and said gaseous fluid ejector conduit communicating directly with lift surfaces exterior to said engine and diffuser system.

16. A pulse-jet engine comprising two combustion chambers, a resonator having a substantially U-shaped cross-section including a medial section and two arms connecting the medial section with the corresponding chambers, a partition dividing each arm into two ducts of which one flares towards the combustion chamber and opens into the latter and the other flares towards the medial section, means for providing an input of air into the outwardly concave wall of the medial section of the resonator between the arms thereof, a core extending across the resonator perpendicularly to the U-shaped cross-section and having a cross-sectional shape which is substantially that of a curvilinear triangle facing the air input through an apex in proximity with the latter, a series of partitions extending in each channel formed between said core and the cooperating wall of the medial section to subdivide said channel longitudinally, an ejection pipe opening into the outwardly convex wall of the medial section of the resonator between the arms thereof, a further core extending across the resonator perpendicularly to the U-shaped cross-section thereof and having a cross-sectional shape which is substantially that of a curvilinear triangle facing the ejection pipe through an apex in proximity with the latter, a series of partitions extending in each channel formed between last mentioned core and the cooperating convex wall of the medial section to subdivide said channel longitudinally, means for injecting fuel into each combustion chamber and means for igniting said fuel at the moment at which the air pressure in said chamber has reached substantially its maximum value.

17. A pulse-jet engine comprising two combustion chambers facing away from each other in divergent directions, a resonator having a substantially U-shaped cross-section including a medial section and two arms connecting the medial section with the corresponding chambers and into the outer ends of which the corresponding combustion chambers open along an acute angle, a partition dividing each arm into two ducts of which one flares towards the combustion chamber and opens into the latter and the other flares towards the medial section, means for providing an input of air into the outwardly concave wall of the medial section of the resonator between the arms thereof, a core extending across the resonator perpendicularly to the U-shaped cross-section and having a cross-sectional shape which is substantially that of a curvilinear triangle facing the air input through an apex in proximity with the latter, a series of partitions extending in each channel formed between said core and the cooperating wall of the medial section to subdivide said channel longitudinally, an ejection pipe opening into the outwardly convex wall of the medial section of the resonator between the arms thereof, a further core extending across the resonator perpendicularly to the U-shaped cross-section thereof and having a cross-sectional shape which is substantially that of a curvilinear triangle facing the ejection pipe through an apex in proximity with the latter, a series of partitions extending in each channel formed between the last mentioned core and the cooperating convex wall of the medial section to subdivide said channel longitudinally, means for injecting fuel into each combustion chamber and means for igniting said fuel at the moment at which the air pressure in said chamber has reached substantially its maximum value.

18. A pulse-jet engine comprising two combustion chambers, a resonator having a substantially U-shaped cross-section including a medial section and two arms connecting the medial section with the corresponding chambers, a partition dividing each arm into two ducts of which one flares towards the combustion chamber and opens into the latter and the other flares towards the medial section, means for providing an input of air into the outwardly concave wall of the medial section of the resonator between the arms thereof, a core extending across the resonator perpendicularly to the U-shaped cross-section and having a cross-sectional shape which is substantially that of a curvilinear triangle facing the air input through an apex in proximity with the latter, a series of partitions extending in each channel formed between said core and the cooperating wall of the medial section to subdivide said channel longitudinally, pressure-sensitive means subjected to the pressure in each arm, an electronic system controlled by said pressure-sensitive means and adapted to produce pulses each time the pressure passes in the corresponding arm through a predetermined value and fuel-injecting and firing means in each combustion chamber and controlled by the pulses fed by the pressure-sensitive means subjected to the pressure in the arm opening into the other combustion chamber.

19. An engine as claimed in claim 16 comprising air feeding and gas exhausting means extending between the air input and the ejection pipe and beyond the latter substantially at right angles with the U-shaped cross-section to open into the atmosphere at the outer ends of the channel means, said channel means including incurved walls merging into the injection pipe and convexity of which is turned inwardly to guide the air entering the input and the burnt gases passing into the ejection pipe, and partitions extending inside the section of the channel means registering with the air input and with the ejection pipe to produce a multiple aspirator effect.

20. A pulse-jet engine comprising two combustion chambers, a resonator including a medial section and two arms connecting the medial section with the corresponding chambers, a partition dividing each arm into two ducts, one of which flares towards the combustion chamber and opens into the latter and the other flares towards the medial section, means for providing an input of air into the outwardly concave wall of the medial section of the resonator between the arms thereof, a core extending across the resonator and having a cross-sectional shape which is substantially that of a curvilinear triangle facing the air input through an apex in proximity with the latter, a series of partitions extending in each channel formed between said core and the cooperating wall of the medial section to subdivide said channel longitudinally, an ejection pipe opening into the outwardly convex wall of the medial section of the resonator between the arms thereof, a further core extending across the resonator and having a cross-sectional shape which is substantially that of a curvilinear triangle facing the ejection pipe through an apex in proximity with the latter, a series of partitions extending in each channel formed between the last mentioned core and the cooperating convex wall of the medial section to subdivide said channel longitudinally, means for injecting fuel into each combustion chamber and means for igniting said fuel at the moment at which the air pressure in said chamber has reached substantially its maximum value.

References Cited in the file of this patent
UNITED STATES PATENTS
1,069,694    Hayot _____ Aug. 12, 1913